（12）United States Patent
Hotta et al.

(10) Patent No.: US 11,508,957 B2
(45) Date of Patent: Nov. 22, 2022

(54) ELECTRODE, SECONDARY BATTERY, BATTERY PACK, VEHICLE AND STATIONARY POWER SOURCE

(71) Applicant: KABUSHIKI KAISHA TOSHIBA, Minato-ku (JP)

(72) Inventors: Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 156 days.

(21) Appl. No.: 16/804,322

(22) Filed: Feb. 28, 2020

(65) Prior Publication Data

US 2020/0203722 A1 Jun. 25, 2020

Related U.S. Application Data

(63) Continuation of application No. PCT/JP2019/009612, filed on Mar. 11, 2019.

(30) Foreign Application Priority Data

Sep. 13, 2018 (JP) .............................. JP2018-171669

(51) Int. Cl.
*H01M 4/36* (2006.01)
*H01M 4/42* (2006.01)
(Continued)

(52) U.S. Cl.
CPC ............. *H01M 4/366* (2013.01); *H01M 4/42* (2013.01); *H01M 4/485* (2013.01); *H01M 10/36* (2013.01);
(Continued)

(58) Field of Classification Search
CPC .......... H01M 4/36; H01M 4/366; H01M 4/42; H01M 4/485; H01M 10/36; H01M 10/425
See application file for complete search history.

(56) References Cited

U.S. PATENT DOCUMENTS 5,582,934 A 12/1996 Steinbrecher
6,403,253 B1 6/2002 Wainwright et al.
(Continued)

FOREIGN PATENT DOCUMENTS

EP 3 413 391 A1 12/2018
JP 9-508490 A 8/1997
(Continued)

OTHER PUBLICATIONS

International Search Report dated May 28, 2019 in PCT/JP2019/009612 filed Mar. 11, 2019, citing documents AI,AJ,AK,BT & BU therein, 5 pages.

(Continued)

*Primary Examiner* — Karie O'Neill Apicella
(74) *Attorney, Agent, or Firm* — Oblon, McClelland, Maier & Neustadt, L.L.P.

(57) ABSTRACT

An electrode comprises a current collector; and an active material-containing layer having active materials on the current collector. The active material-containing layer has a first surface contacting the current collector and a second surface which is opposite side of the first surface. At least one part of the second surface is covered by a compound containing Zn. When an image of the second surface is taken by Scanning Electron Microscope, the image is divided into 100 blocks, a ratio of existence of blocks having hexagonal platelet shaped compound containing Zn to the 100 blocks is calculated, and the ratio of existence of blocks is calculated with respect to 10 images, an average of the ratio of (Continued)

existence of blocks with respect to the 10 images is 20% or less (including 0).

13 Claims, 10 Drawing Sheets

(51) Int. Cl.
  *H01M 4/485* (2010.01)
  *H01M 10/36* (2010.01)
  *H01M 10/42* (2006.01)
  *H01M 4/02* (2006.01)
(52) U.S. Cl.
  CPC .... *H01M 10/425* (2013.01); *H01M 2004/027* (2013.01); *H01M 2010/4271* (2013.01); *H01M 2300/0002* (2013.01); *H01M 2300/0091* (2013.01)

(56) References Cited

U.S. PATENT DOCUMENTS

| | | | |
|---|---|---|---|
| 10,079,390 | B2 | 9/2018 | Matsuno et al. |
| 10,461,370 | B2 | 10/2019 | Hotta et al. |
| 2010/0167129 | A1 | 7/2010 | Wu et al. |
| 2013/0130128 | A1 | 5/2013 | Okamoto et al. |
| 2015/0188193 | A1 | 7/2015 | Kodama et al. |
| 2017/0271682 | A1* | 9/2017 | Matsuno ............... H01M 4/62 |
| 2017/0271717 | A1 | 9/2017 | Yamashita et al. |
| 2018/0269538 | A1* | 9/2018 | Hotta ............... H01M 4/485 |
| 2018/0277899 | A1 | 9/2018 | Takami et al. |
| 2018/0316064 | A1* | 11/2018 | Wei ............... H01M 4/42 |

FOREIGN PATENT DOCUMENTS

| | | |
|---|---|---|
| JP | 11-505364 A | 5/1999 |
| JP | 2000-77073 A | 3/2000 |
| JP | 2003-17057 A | 1/2003 |
| JP | 2005-71807 A | 3/2005 |
| JP | 2006-127848 A | 5/2006 |
| JP | 4691966 B2 | 6/2011 |
| JP | 5055390 B2 | 10/2012 |
| JP | 2014-63596 A | 4/2014 |
| JP | 5861635 B2 | 2/2016 |
| JP | 2016-146341 A | 8/2016 |
| JP | WO 2017/135323 A1 | 8/2017 |
| JP | 2017-174809 A | 9/2017 |
| JP | 2017-174810 A | 9/2017 |
| JP | 2018-45966 A | 3/2018 |
| JP | 2018-92955 A | 6/2018 |
| JP | 6383038 B1 | 8/2018 |
| JP | 2018-156926 A | 10/2018 |
| WO | WO 2017/070340 A1 | 4/2017 |

OTHER PUBLICATIONS

Written Opinion dated May 28, 2019 in PCT/JP2019/009612 filed Mar. 11, 2019, 8 pages.
Liu, et al. "Rechargeable Aqueous Lithium-ion Battery of $TiO_2$/$LiMn_2O_4$ with a High Voltage", Journal of the Electrochemical Society 158 (12), 2011, pp. A1490-A1497.
Noguchi et al. "The structure of Electrodeposited Zinc Dendrites", Denki Kagaku, No. 43, Issue 2, 1975, pp. 84-88 (with English translation).

* cited by examiner

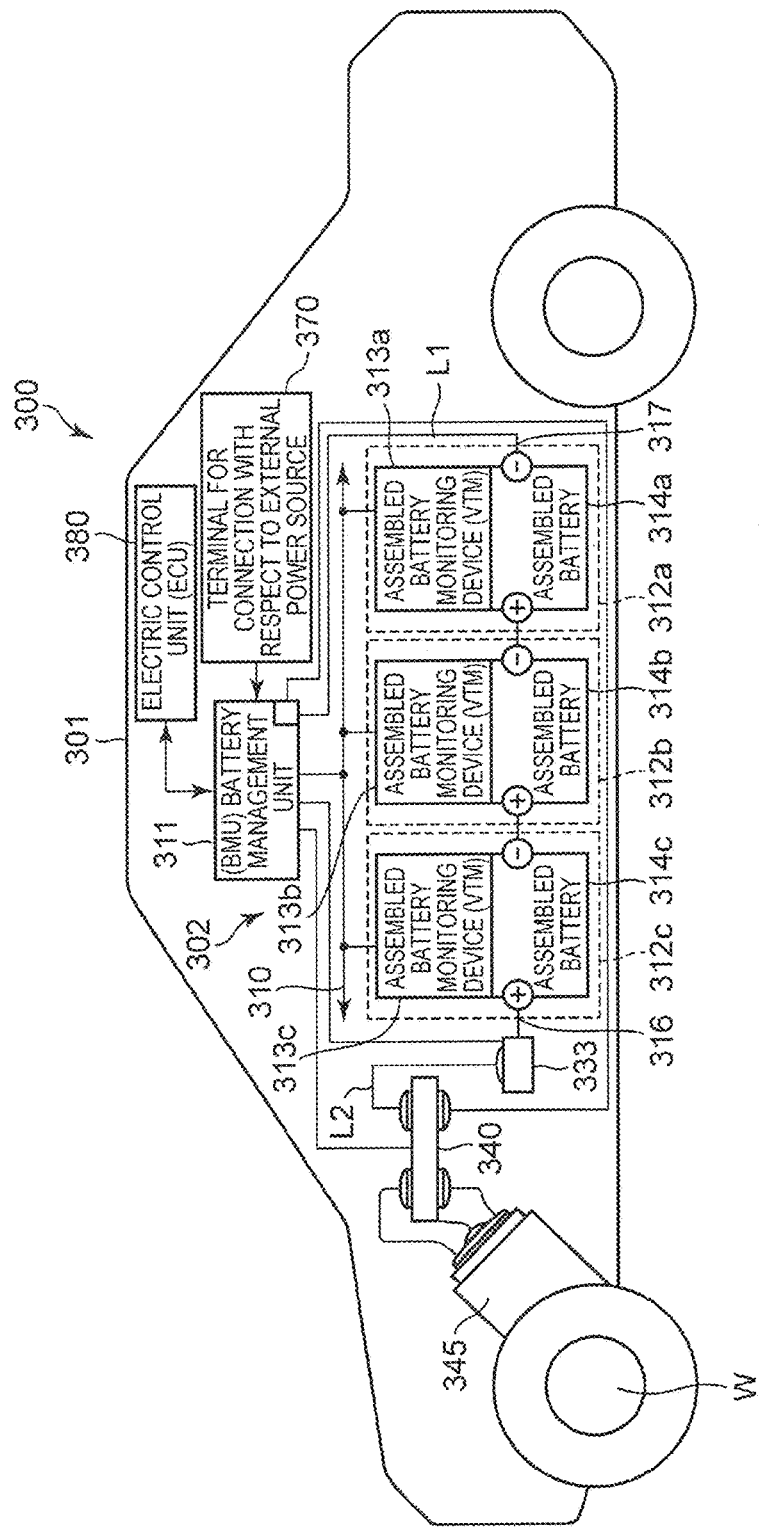
F I G. 12

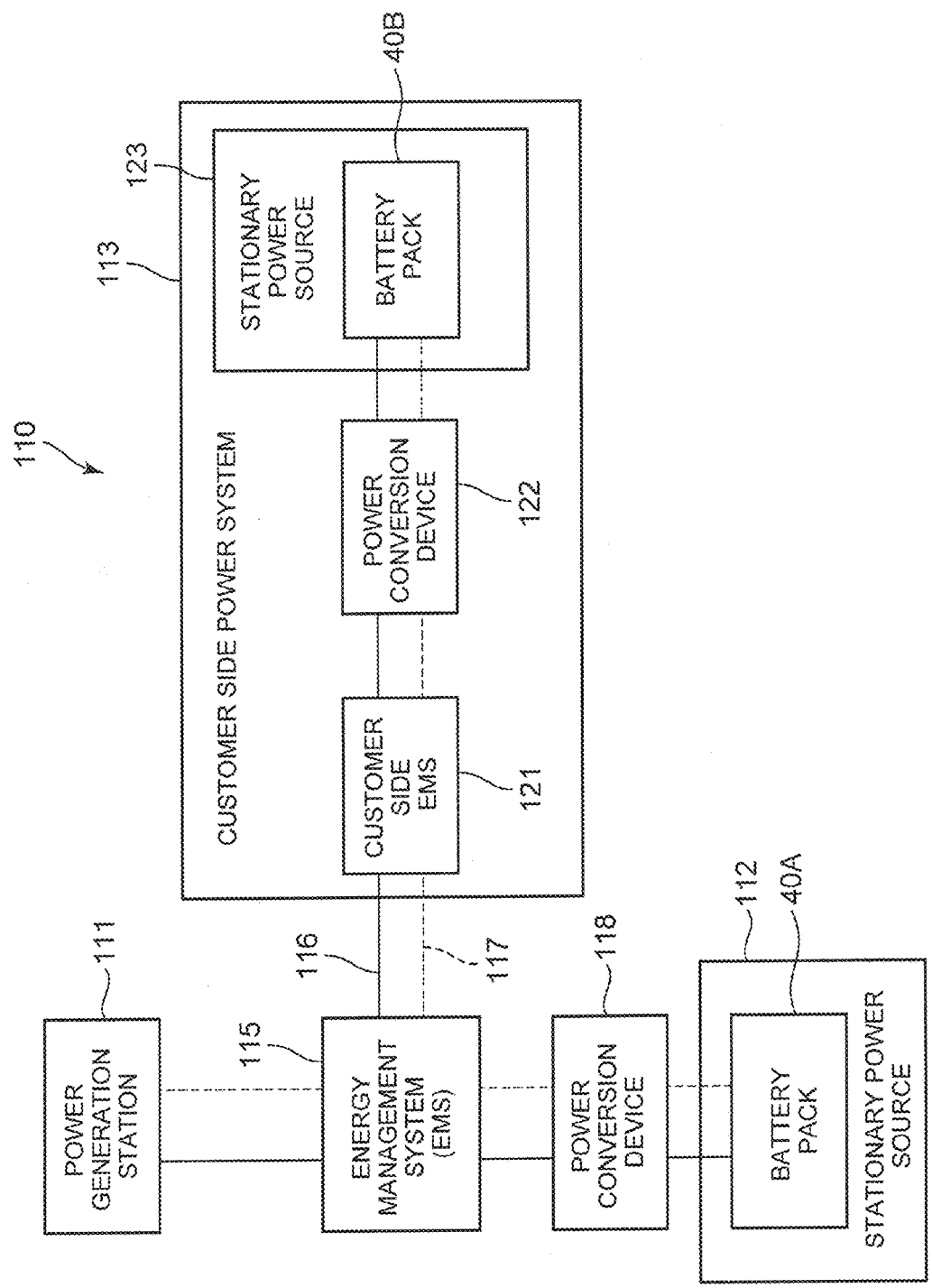
F I G. 13

ELECTRODE, SECONDARY BATTERY, BATTERY PACK, VEHICLE AND STATIONARY POWER SOURCE

CROSS-REFERENCE TO RELATED APPLICATIONS

This application is a Continuation Application of PCT Application No. PCT/JP2019/009612, filed Mar. 11, 2019 and based upon and claiming the benefit of priority from Japanese Patent Application No. 2018-171669, filed on Sep. 13, 2018, the entire contents of all of which are incorporated herein by reference.

FIELD

Embodiments of the present invention relate to an electrode, a secondary battery, a battery pack, a vehicle and a stationary power source.

BACKGROUND

A non-aqueous electrolyte battery using a carbon material or a lithium titanium oxide, as a negative electrode active material, and a layered oxide containing nickel, cobalt, manganese, and the like, as a positive electrode active material, in particular, a non-aqueous electrolyte secondary battery has been already in practical use, as a power source in a wide range. Furthermore, the form of such a non-aqueous electrolyte battery is various, from a small-size for various electronic devices, to a large-size for an electric vehicle or the like. A non-aqueous organic solvent mixed with ethylene carbonate, methyl ethyl carbonate, or the like, is used in an electrolyte of the secondary battery, unlike a nickel hydrogen battery or a lead storage battery. The electrolyte using such a solvent has higher oxidation resistance and reduction resistance than those of an aqueous electrolyte, and hardly causes the electrolysis of the solvent. For this reason, in the non-aqueous electrolyte secondary battery, it is possible to realize a high electromotive force of 2 V to 4.5 V.

On the other hand, many organic solvents are a combustible substance, and the safeness of the secondary battery is easily degraded in principle, compared to a secondary battery using an aqueous solution. Various countermeasures have been made in order to improve the safeness of a secondary battery using an organic solvent-based electrolyte, but it is not necessarily sufficient. In addition, a dry environment is required for the non-aqueous electrolyte secondary battery in a manufacturing step, and thus, the manufacturing cost inevitably increases. In addition, the conductivity of the organic solvent-based electrolyte is degraded, and thus, internal resistance of the non-aqueous electrolyte secondary battery easily increases. Such problems become big problems in an electric vehicle or a hybrid electric vehicle in which battery safeness or battery cost is regarded as important, and in large-size storage battery application for power storage. In order to solve the problems of the non-aqueous electrolyte secondary battery, a secondary battery using an aqueous electrolyte has been provided. However, an active material can be easily peeled off from a collector due to the electrolysis of the aqueous electrolyte, and thus, the operation of the secondary battery is not stabilized, and sufficient charge and discharge is not performed.

BRIEF DESCRIPTION OF THE DRAWINGS

FIG. 12 is a diagram schematically illustrating a vehicle of another example according to the fifth embodiment; and FIG. 13 is a block diagram illustrating an example of a system including a stationary power source according to a sixth embodiment.

DETAILED DESCRIPTION

Figure 1:
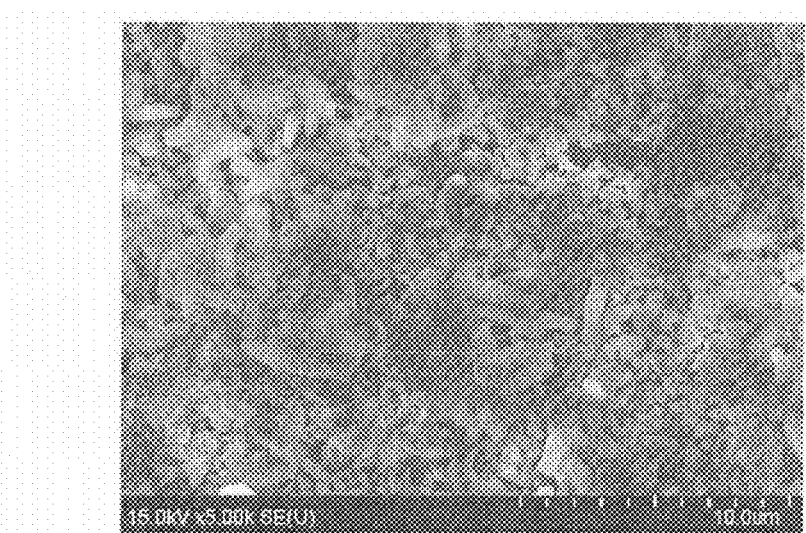
FIG. 1 is a SEM image of a negative electrode surface at the time of using an electrode according to a first embodiment in a negative electrode.

Embodiments described herein provide an electrode capable of improving a charge and discharge efficiency and a self-discharge characteristic, a secondary battery, a battery pack, a vehicle, and a stationary power source, including the electrode.

According to one embodiment, provided is an electrode including a current collector and an active material-containing layer on the current collector. The active material-containing layer has active materials. The active material-containing layer has a first surface and a second surface. The first surface is in contact with the current collector. The second surface is an opposite side with respect to the first surface. At least one part of the second surface is covered by a compound containing Zn. When an image of the second surface is taken by Scanning Electron Microscope, the image is divided into 100 blocks, a ratio of existence of blocks having hexagonal platelet shaped compound containing Zn to the 100 blocks is calculated, and the ratio of existence of blocks is calculated with respect to 10 images, an average of the ratio of existence of blocks with respect to the 10 images is 20% or less (including 0)

Hereinafter, embodiments will be described with reference to the drawings. Furthermore, in the embodiments, the same reference numerals are applied to common configurations, and the repeated description will be omitted. In addition, each of the drawings is a schematic view for prompting the description of the embodiments and the understanding thereof, and a shape or a dimension, a ratio, and the like may be different from those of an actual device, but can be suitably design-changed in consideration of the following description and a known technology.

First Embodiment

In order to solve problems of a non-aqueous electrolyte secondary battery, it has been considered that an electrolyte is formed into an aqueous solution. In an aqueous electrolyte, it is necessary that a potential range for performing charge and discharge of the battery is kept within a potential range in which an electrolysis reaction of water contained as a solvent does not occur. For example, a lithium manganese oxide is used as a positive electrode active material, and a lithium vanadium oxide is used as a negative electrode active material, and thus, it is possible to avoid electrolysis of a water solvent. In such a combination, an electromotive force of approximately 1 V to 1.5 V is obtained, but a sufficient energy density as the battery is hardly obtained.

In a case where the lithium manganese oxide is used as the positive electrode active material, and the lithium titanium oxide such as $LiTi_2O_4$ and $Li_4Ti_5O_{12}$ is used as the negative electrode active material, theoretically, an electromotive force of approximately 2.6 V to 2.7 V is obtained, and thus, a battery that is attractive from the viewpoint of an energy density, can be obtained. In a non-aqueous lithium ion battery to which such a combination of the positive and negative electrode materials is adopted, excellent life performance is obtained, and such a battery has been already in practical use. However, in the aqueous electrolyte, a potential of lithium insertion and extraction of the lithium titanium oxide is approximately 1.5 V (vs. $Li/Li^+$) at a lithium potential reference, and thus, the electrolysis of the aqueous electrolyte easily occurs. In particular, in a negative electrode, hydrogen is vigorously generated due to electrolysis on a negative electrode collector or on the surface of a metallic exterior can that is electrically connected to the negative electrode, and thus, the active material can be easily peeled off from the collector. For this reason, in such a battery, the operation is not stabilized, and thus, it is not possible to perform sufficient charge and discharge.

In the related technology, zinc is contained in the collector, and thus, it is possible to provide a lithium secondary battery that has a sufficient energy density, is excellent in a charge and discharge efficiency and the life performance, is inexpensive, and has high safeness, but there is room for improvement in the charge and discharge efficiency and a self-discharge characteristic.

The inventors have conducted intensive studies for solving the problems, and have invented an electrode according to a first embodiment.

The electrode according to the first embodiment is an electrode including a collector, and an electrode active material mixture layer containing an electrode active material, on the collector, in which at least a part of at least a surface of the electrode mixture layer on a side opposite to a surface in contact with the collector is covered with a compound having Zn, and when one visual field, in which the opposite surface is imaged by an electron scanning microscope, is divided into 100 partitions, and a ratio of the number of partitions having the hexagonal plate-like compound containing Zn with respect to the 100 partitions is obtained, the average obtained in 10 visual fields is less than or equal to 20% (including 0).

The electrode includes the collector, and the electrode active material mixture layer containing the electrode active material, on the collector. Zn on the surface of the electrode exists as the compound having Zn. The compound having Zn has Zn as a main component, forms at least one type of a metal single body of Zn, an oxide, a chloride, a nitrate, a sulfate, and a hydroxide to be precipitated on the surface. Here, for the sake of convenience, the metal single body will be also referred to as a compound. The compound having Zn exists on the surface of an electrode active material, a conductive assistant, and a binder, and on the surface of the collector. At this time, the compound having Zn physically exists. The electrode can be used in both of a positive electrode and a negative electrode. The compound having Zn has a small exchange current density, and a high hydrogen generation overvoltage. For this reason, in a case where the electrode according to the first embodiment is used in the negative electrode, it is possible to suppress hydrogen generation.

Hereinafter, a case where the electrode according to this embodiment is used in the negative electrode, will be described as an example.

Figure 2:
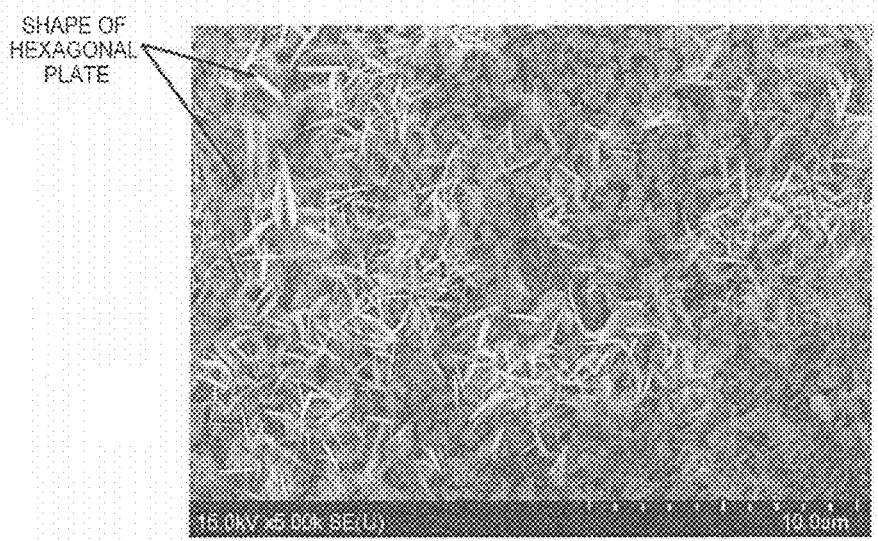
FIG. 2 is a SEM image of a negative electrode surface at the time of using an electrode different from that of the first embodiment in a negative electrode.

FIG. 1 is a SEM image of a negative electrode surface at the time of using the electrode according to the first embodiment in the negative electrode. FIG. 1 is a scanning electron microscope (SEM) image obtained by measuring the negative electrode surface at the time of using the electrode according to the first embodiment in the negative electrode, at 5000 times, and FIG. 2 is a SEM image of the negative electrode surface at the time of using an electrode illustrated as a comparison different from that of the first embodiment in the negative electrode, and is a SEM image obtained by measuring a negative electrode surface different from that of the first embodiment, at 5000 times. Thus, comparing FIG. 1 with FIG. 2, in FIG. 2, in the compound having Zn covering the surface of the negative electrode, many hexagonal plate-like compounds having Zn are observed, whereas in FIG. 1, in the compound having Zn covering the surface of the negative electrode, the hexagonal plate-like compound having Zn is not observed. The hexagonal plate-like compound having Zn easily becomes a film having low denseness, and thus, in a case where many hexagonal plate-like compounds having Zn exist on the surface of the negative electrode, the negative electrode surface is directly in contact with water, which is not preferable. For this reason, it is preferable that in the compound having Zn covering the surface of the negative electrode, the content of the hexagonal plate-like compound having Zn is less than or equal to 20%. It is more preferable that the content of the hexagonal plate-like compound having Zn is less than or equal to 15%. This is because the hexagonal plate-like compound having Zn, existing on the surface of the negative electrode, is suppressed to be less than or equal to 15%, and thus, it is also possible to decrease the resistance of the electrode. The content of the hexagonal plate-like compound having Zn, existing on the surface of the negative electrode, may be 0%. For this reason, in FIG. 1, the hexagonal plate-like compound having Zn is not observed.

Thus, in a case where the content of the hexagonal plate-like compound having Zn, existing on the surface of the negative electrode, is less than or equal to 20%, it is possible to suppress the hydrogen generation from the negative electrode, to improve binding properties between the collector and the active material, and to increase an electron conduction path. Accordingly, it is possible to improve a cycle characteristic, and to decrease the resistance. For this reason, it is possible to improve the charge and discharge efficiency and the self-discharge characteristic.

Further, in a case where the content of the hexagonal plate-like compound having Zn, existing on the surface of the negative electrode, is less than or equal to 20%, an active material surface is covered with Zn having a high hydrogen overvoltage, and the hydrogen generation due to water decomposition on the surface is suppressed, and thus, it is possible to improve the charge and discharge efficiency and the self-discharge characteristic.

In a case where the content of the hexagonal plate-like compound having Zn, existing on the surface of the negative electrode, is greater than 20%, a covering density of Zn decreases, and thus, in order to have the same action as that of being covered with dense Zn, the thickness of a Zn covering layer increases. The thickness of the covering layer increases, and thus, it is not possible to ignore the resistance of the covering layer, and the resistance of the battery increases. For this reason, the performance of the battery decreases. In addition, the thickness of Zn covering layer increases, and thus, the conduction of lithium, sodium, or magnesium is hindered, and the battery functions as a zinc battery.

The hexagonal plate-like compound having Zn existing on the surface of the negative electrode has been described, but there is a case where the hexagonal plate-like compound having Zn also exists on the surface of the negative electrode active material, the conductive assistant, and the binder, in the negative electrode.

The compound having Zn, for example, is capable of existing as follows. In respect of the electrode including the electrode collector and the electrode active material mixture layer, the electrode and a counter electrode are put into an aqueous solution containing Zn that is a raw material of the compound having Zn, an additive, and a pH adjuster, and are subjected to an energization treatment, and thus, it is possible to allow the compound having Zn to exist on the electrode surface, and to produce the electrode according to this embodiment. Specifically, the electrode and a carbon electrode facing the electrode are put into an aqueous solution containing 10 g/L of zinc oxide in terms of metal zinc, 2 M of sodium hydroxide, 0.3 wt % of butyne-1,4-diol, in 1 L of water, and are subjected to the energization treatment at a current density of 10 mA/cm$^2$ for 10 minutes. In addition, it is possible to form the negative electrode surface according to precipitation, at the time of the manufacturing. Further, in the state of existing on the surface of the negative electrode or an existing amount on the surface, mainly, a rate at the time of the initial charge, the composition of the electrolyte, and the number of cycles are important. In addition, the amount of metal contained in the electrolyte is also important, and the concentration of Zn in the electrolyte is also an important parameter at the time of metal covering. When Zn is not added into the electrolyte, and for example, the compound having Zn is used as the collector, it is possible to control the amount of Zn in the electrolyte, according to a time from the assembly of the battery to the initial charge and discharge.

In the electrode according to this embodiment, the surface of the negative electrode is covered with the compound having Zn, and thus, it is possible to form the electrode surface having a high hydrogen overvoltage. As a result thereof, even in the vicinity of 1.5 V (vs. Li/Li$^+$) at a lithium potential reference, it is possible to perform charge and discharge with respect to a titanium oxide, a lithium titanium oxide, and a lithium titanium composite oxide, in an aqueous solvent. In the secondary battery, for example, Zn can be contained in the collector, the electrolyte, or the negative electrode.

Here, a measurement method of the hexagonal plate-like compound having Zn on the negative electrode surface, will be described. The existence or non-existence of the hexagonal plate-like compound having Zn on the negative electrode surface, can be detected by using X-ray diffraction (XRD) from the report of NOGUCHI et al. (F. Noguchi, K. Kaneko, M. Kikuchi; DENKI KAGAKU, 43, 84 (1975)). In the case of using the XRD, the hexagonal plate-like compound having Zn, is easily detected as a crystalline body surrounded by a 100 plane and a 001 plane, and can be easily determined from the regular shape. Describing a measurement procedure in detail, first, it is confirmed whether or not the hexagonal plate-like metal compound exists on the negative electrode surface, by using the XRD. Next, a metal element is specified by a scanning electron microscope-energy dispersive X-ray spectroscopy (SEM-EDX) measuring the negative electrode surface at 5000 times, and the existence of the hexagonal plate-like compound is confirmed from an image obtained from the SEM-EDX. In a case where the hexagonal plate-like compound is confirmed, a ratio of the hexagonal plate-like compound is calculated. In a calculation method, one SEM image obtained from the SEM-EDX is divided into 100 partitions obtained by equally dividing the SEM image into 10 in each of a vertical direction and a horizontal direction of the image. In each of the 100 partitions, the compound can be confirmed, that is, the ratio of the existence or non-existence of the compound is calculated from the number of partitions, the ratio of the hexagonal plate-like compound in one SEM image is measured. Such a procedure is performed with respect to 10 images photographed with respect to the negative electrode, and the average of the ratios is confirmed. Such a manipulation is performed with respect to arbitrary 10 spots on the negative electrode surface, and it is preferable that the average of all measurement results is less than or equal to 20%.

The electrode according to this embodiment is an electrode including the collector, and the electrode active material mixture layer containing the electrode active material, on the collector, in which at least a part of at least the surface of the electrode mixture layer on a side opposite to the surface in contact with the collector, is covered with the compound having Zn, and one visual field in which the opposite surface is imaged by the electron scanning microscope, is divided into 100 partitions, the ratio of the number of partitions containing the hexagonal plate-like compound having Zn, with respect to 100 partitions, is obtained, and the average obtained in 10 visual fields, is less than or equal to 20% (including 0). For this reason, the active material surface is covered with Zn having a high hydrogen overvoltage, and thus, the hydrogen generation due to the water decomposition, on the surface, can be suppressed. Thus, in the secondary battery including the electrode according to this embodiment, it is possible to improve the charge and discharge efficiency and the self-discharge characteristic.

Second Embodiment

A non-aqueous electrolyte secondary battery according to a second embodiment will be described.

The non-aqueous electrolyte secondary battery according to the second embodiment includes an exterior material, a positive electrode stored in the exterior material, a negative electrode containing an active material, which is stored in the exterior material, for example, through a separator, by being spatially separated from the positive electrode, and a non-aqueous electrolyte filled in the exterior material. Here, in a case where the electrode according to the first embodiment is set to the negative electrode, a material of each member that can be used in the secondary battery according to the second embodiment, will be described in detail.

1) Negative Electrode

The negative electrode includes a negative electrode collector, and a negative electrode active material mixture layer arranged on the negative electrode collector. The negative electrode active material mixture layer is arranged on at least one surface of the negative electrode collector. For example, the negative electrode active material mixture layer may be arranged on one surface of the negative electrode collector, or the negative electrode active material mixture layer may be arranged on one surface and a rear surface of the negative electrode collector.

The negative electrode active material mixture layer contains a negative electrode active material including at least one type of compound selected from the group consisting of a titanium oxide, a lithium titanium oxide, and a lithium titanium composite oxide. Only one type of such oxides may be used, or a plurality of types thereof may be used. In such oxides, a Li insertion and extraction reaction occurs within a range of greater than or equal to 1 V and less than or equal to 2 V (vs. Li/Li$^+$) at a lithium potential reference. For this reason, in a case where such oxides are used as the negative electrode active material of the secondary battery, a volume expansion and contraction change due to charge and discharge decreases, and thus, it is possible to realize long service life.

It is preferable that the negative electrode collector contains at least one type of element selected from Zn, Ga, In, Bi, Tl, Sn, Pb, Ti, and Al in the collector. Only one type of such elements can be used, or a plurality of types thereof may be used, and such elements can be contained as a metal or a metal alloy. Such a metal and a metal alloy may be independently contained, or a mixture of two or more types thereof may be contained. In a case where Zn is contained in the collector, the mechanical strength of the collector increases, and thus, machining performance is improved. Further, the electrolysis of the aqueous solvent is suppressed, and thus, the effect of suppressing the hydrogen generation, increases. In the elements described above, Zn, Pb, Ti, and Al are more preferable.

The collector, for example, is a metal foil formed of such metals. In addition, the collector, for example, is a foil formed of an alloy containing such metals. Such a foil is capable of containing, for example, one type or two or more types of elements described below, other than Zn. Examples of the shape of a metal body, include a mesh, a porous body, or the like, other than the foil. In order to improve the energy density or the output, it is desirable that the metal body is in the shape of a foil having a small volume and a large surface area.

In addition, the negative electrode collector is capable of including a substrate containing a metal different from Zn. In such a case, the compound having Zn exists on at least a part of the surface of the substrate, and thus, it is possible to suppress the hydrogen generation. It is desirable that the compound having Zn, existing on the surface, is arranged to be in contact with the negative electrode active material mixture layer. For example, the substrate is subjected to Zn-plating, and thus, Zn is capable of existing on the surface of the substrate. In addition, the surface of the substrate can be subjected to a plating treatment using an alloy containing Zn.

The collector may contain a compound having Zn, and a metal A that is at least one type selected from the group consisting of Sn, Hg, In, Cd, and Pb. It is preferable that an oxide of Zn and the metal A, and/or a hydroxide of Zn and the metal A, and/or a basic carbonate compound of Zn and the metal A, and/or a sulfate compound of Zn and the metal A, are contained in a depth region of greater than or equal to 5 nm and less than or equal to 1 μm from the surface in a depth direction, in at least a part of a surface region of the collector. Furthermore, examples of the oxide of Zn include ZnO, examples of the hydroxide of Zn include Zn(OH)$_2$, examples of the basic carbonate compound of Zn include 2ZnCO$_3$.3Zn(OH)$_2$, and examples of the sulfate compound of Zn include ZnSO$_4$.7H$_2$O, and the like.

In a case where at least one type of the oxide of Zn and the metal A, the hydroxide of Zn and the metal A, the basic carbonate compound of Zn and the metal A, and the sulfate compound of Zn and the metal A, exists on a surface layer portion of the collector, it is possible to suppress the hydrogen generation. In addition, in a case where such compounds exist on the surface layer portion of the collector, it is possible to improve adhesiveness between the collector and the active material, and to increase the electron conduction path, and thus, it is possible to improve the cycle characteristic and to decrease the resistance.

The compound having the metal A, may exist on the surface of the electrode active material, the conductive assistant, and the binder, and on the surface of the collector, as with the compound having Zn.

It is preferable that the substrate contains at least one type of metal selected from Al, Fe, Cu, Ni, and Ti. Such metals can be contained as an alloy. In addition, the substrate is capable of independently containing such metals and metal alloys, or is capable of containing a mixture of two or more types thereof. It is preferable that the substrate contains Al, Ti, or an alloy thereof, from the viewpoint of a reduction in weight.

It is possible to examine whether or not the collector contains the compound having Zn, and the metal A that is at least one type selected from the group consisting of Sn, Hg, In, Cd, and Pb, by disassembling the battery as described above, and then, for example, by performing inductively coupled plasma (ICP) light emission analysis.

The negative electrode active material includes one type or two or more types of compounds selected from the group consisting of the titanium oxide, the lithium titanium oxide, and the lithium titanium composite oxide, as described above. Examples of the lithium titanium composite oxide include a niobium titanium oxide and a sodium niobium titanium oxide. It is desirable that a Li storing potential of such compounds, is in a range of greater than or equal to 1 V (vs. Li/Li$^+$) and less than or equal to 3 V (vs. Li/Li$^+$), at a potential where a lithium ion storing and releasing potential is based on metal lithium.

Examples of the titanium oxide include a titanium oxide of a monoclinic structure, a titanium oxide of a rutile structure, and a titanium oxide of an anatase structure. In the titanium oxide of each crystalline structure, the composition before the charge can be represented by TiO$_2$, and the composition after the charge can be represented by Li$_x$TiO$_2$ (x is 0≤x). In addition, a structure before charge of the titanium oxide of the monoclinic structure, can be represented by TiO$_2$ (B).

Examples of the lithium titanium oxide include a lithium titanium oxide of a spinel structure (for example, a general formula of Li$_{4+x}$Ti$_5$O$_{12}$ (x is −1≤x≤3)), a lithium titanium oxide of a ramsdellite structure (for example, Li$_{2+x}$Ti$_3$O$_7$ (−1≤x≤3)), Li$_{1+x}$Ti$_2$O$_4$ (0≤x≤1), Li$_{1.1+x}$Ti$_{1.8}$O$_4$ (0≤X≤1), Li$_{1.07+x}$Ti$_{1.86}$O$_4$ (0≤x≤1), and Li$_x$TiO$_2$ (0<x), and the like.

Examples of the niobium titanium oxide include a niobium titanium oxide that can be represented by $Li_aTiM_bNb_{2\pm\beta}O_{7\pm\sigma}$ (0≤a≤5, 0≤b≤0.3, 0≤β≤0.3, 0≤σ≤0.3, and M is at least one type of element selected from the group consisting of Fe, V, Mo, and Ta).

Examples of the sodium niobium titanium oxide include an orthorhombic Na-containing niobium titanium composite oxide that can be represented by a general formula of $Li_{2+v}Na_{2-w}M1_xTi_{6-y-z}Nb_yM2_zO_{14+\delta}$ (0≤v≤4, 0<w<2, 0≤x<2, 0<y<6, 0≤z<3, y+z<6, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al).

The compound that is preferable as the negative electrode active material, includes the titanium oxide of the anatase structure, the titanium oxide of the monoclinic structure, and the lithium titanium oxide of the spinel structure. In each of the compounds, a Li storing potential is in a range of greater than or equal to 1.4 V (vs. $Li/Li^+$) and less than or equal to 2 V (vs. $Li/Li^+$), and thus, for example, it is possible to obtain a high electromotive force by being combined with a lithium manganese oxide as the positive electrode active material. Among them, the lithium titanium oxide of the spinel structure is more preferable, since a volume change due to a charge and discharge reaction is extremely small.

The negative electrode active material can be contained in the negative electrode active material mixture layer in the form of particles. Negative electrode active material particles, can be a single primary particle, secondary particles that are an aggregate of the primary particles, or a mixture of the single primary particle and the secondary particles. The shape of the particles is not particularly limited, and for example, can be in a spherical shape, an elliptic shape, a flat shape, a fiber shape, or the like.

It is preferable that the average particle diameter (the diameter) of the secondary particles of the negative electrode active material, is greater than or equal to 3 μm. It is more preferable that the average particle diameter of the secondary particles of the negative electrode active material is greater than or equal to 5 μm and less than or equal to 20 μm. According to such a range, a surface area of the active material is small, and thus, it is possible to increase the effect of suppressing the hydrogen generation.

The negative electrode active material in which the average particle diameter of the secondary particles is greater than or equal to 3 μm, for example, can be obtained by the following method. First, an active material raw material is subjected to reaction synthesis, and thus, an active material precursor of which the average particle diameter is less than or equal to 1 μm, is produced. After that, a calcining treatment is performed with respect to the active material precursor, and a pulverization treatment is performed by using a pulverizer such as a ball mill or a jet mill. Next, in the calcining treatment, the active material precursors are aggregated to grow to the secondary particles having a large particle diameter.

It is desirable that the average particle diameter of the primary particles of the negative electrode active material is less than or equal to 1 μm. Accordingly, a diffusion distance of Li ions in the active material decreases, and a specific surface area increases. For this reason, it is possible to obtain excellent high input performance (rapid charge performance). On the other hand, in a case where the average particle diameter is small, there is a concern that the particles are easily aggregated, or the distribution of the electrolyte is biased to the negative electrode, and the depletion of the electrolyte in the positive electrode is caused, and thus, it is desirable that the lower limit value is 0.001 μm. It is more preferable that the average particle diameter of the primary particles of the negative electrode active material is greater than or equal to 0.1 μm and less than or equal to 0.8 μm.

It is desirable that in the negative electrode active material particles, the specific surface area in a BET method using $N_2$ precipitation, is in a range of greater than or equal to 3 $m^2/g$ and less than or equal to 200 $m^2/g$. Accordingly, it is possible to further increase compatibility between the negative electrode and the electrolyte.

It is desirable that the specific surface area of the negative electrode active material mixture layer (excluding the collector) is in a range of greater than or equal to 3 $m^2/g$ and less than or equal to 50 $m^2/g$. It is more preferable that the specific surface area is in a range of greater than or equal to 5 $m^2/g$ and less than or equal to 50 $m^2/g$. The negative electrode active material mixture layer can be a porous layer containing the negative electrode active material supported on the collector, a conductive agent, and a binding agent.

It is desirable that the porosity of the negative electrode (excluding the collector) is in a range of 20% to 50%. Accordingly, it is possible to obtain the negative electrode that is excellent in the compatibility between the negative electrode and the electrolyte, and has a high density. It is more preferable that the porosity is in a range of 25% to 40%.

Examples of the conductive agent are capable of including a carbon material such as acetylene black, carbon black, coke, carbon fiber, and black lead, and a metal powder such as nickel and zinc. The type of conductive agent can be one type or two or more types. Hydrogen is generated from the carbon material itself, and thus, it is desirable that the metal powder is used in the conductive agent.

Examples of the binding agent include polytetrafluoroethylene (PTFE), polyvinylidene fluoride (PVdF), fluorine-based rubber, ethylene-butadiene rubber, polypropylene (PP), polyethylene (PE), carboxymethyl cellulose (CMC), polyimide (PI), polyacryl imide (PAI), and the like. The type of the binding agent can be one type or two or more types.

In a compounding ratio of the negative electrode active material, the conductive agent, and the binding agent, to the negative electrode active material mixture layer, it is preferable that the compounding ratio of the negative electrode active material is in a range of greater than or equal to 70 weight % and less than or equal to 95 weight %, the compounding ratio of the conductive agent is in a range of greater than or equal to 3 weight % and less than or equal to 20 weight %, and the compounding ratio of the binding agent is in a range of greater than or equal to 2 weight % and less than or equal to 10 weight %. In a case where the compounding ratio of the conductive agent is greater than or equal to 3 weight %, it is possible to make the conductivity of the negative electrode excellent, and in a case where the compounding ratio of the conductive agent is less than or equal to 20 weight %, it is possible to reduce the decomposition of the electrolyte on a conductive agent surface. In a case where the compounding ratio of the binding agent is greater than or equal to 2 weight %, it is possible to obtain a sufficient electrode strength, and in a case where the compounding ratio of the binding agent is less than or equal to 10 weight %, it is possible to decrease an insulating portion of the electrode.

The negative electrode, for example, can be produced as follows. First, the negative electrode active material, the conductive agent, and the binding agent are dispersed in a suitable solvent, and thus, slurry is prepared. The slurry is applied to the collector, and a coating film is dried, and thus, the negative electrode active material mixture layer is formed on the collector. Here, for example, the slurry may be applied to one surface on the collector, or the slurry may be applied to one surface and a rear surface on the collector. Next, for example, the collector and the negative electrode active material mixture layer are subjected to press such as heating press, and thus, the negative electrode can be produced.

2) Positive Electrode

The positive electrode is capable of including a positive electrode collector, and a positive electrode active material mixture layer that is supported on one surface or both surfaces of the positive electrode collector, and contains an active material, a conductive agent, and a binding agent.

It is preferable that a foil, a porous body, and a mesh, formed of a metal such as stainless steel, Al, and Ti, are used as the positive electrode collector. In order to prevent the corrosion of the collector due to a reaction between the collector and the electrolyte, a collector surface may be covered with a heteroelement.

A positive electrode active material that is capable of storing and releasing lithium or sodium, can be used in the positive electrode active material. The positive electrode may contain one type of positive electrode active material, or is capable of containing two or more types of positive electrode active materials. The positive electrode active material includes a compound of which a lithium ion storing and releasing potential is greater than or equal to 2.5 V and less than or equal to 5.5 V (vs. Li/Li$^+$), at a potential based on metal lithium. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, lithium fluorinated iron sulfate, a phosphate compound of an olivine crystalline structure (for example, Li$_x$FePO$_4$ (0≤x≤1) and Li$_x$MnPO$_4$ (0≤x≤1)), and the like. The phosphate compound of the olivine crystalline structure, is excellent in thermal stability.

Examples of the positive electrode active material capable of obtaining a high positive electrode potential, will be described below. Examples of the positive electrode active material capable of obtaining a high positive electrode potential, include a lithium manganese composite oxide of a spinel structure, such as Li$_x$Mn$_2$O$_4$ (0<x≤1) and Li$_x$MnO$_2$ (0<x≤1), a lithium nickel aluminum composite oxide such as Li$_x$Ni$_{1-y}$Al$_y$O$_2$ (0<x≤1, 0<y≤1), a lithium cobalt composite oxide such as Li$_x$CoO$_2$ (0<x≤1), a lithium nickel cobalt composite oxide such as Li$_x$Ni$_{1-y-z}$Co$_y$Mn$_z$O$_2$ (0<x≤1, 0<y≤1, 0≤z≤1), a lithium manganese cobalt composite oxide such as Li$_x$Mn$_y$Co$_{1-y}$O$_2$ (0<x≤1, 0<y≤1), a spinel type lithium manganese nickel composite oxide such as Li$_x$Mn$_{2-y}$Ni$_y$O$_4$ (0<x≤1, 0<y<2), a lithium phosphate of an olivine structure such as Li$_x$FePO$_4$ (0<x≤1), Li$_x$Fe$_{1-y}$Mn$_y$PO$_4$ (0<x≤1, 0≤y≤1), and Li$_x$CoPO$_4$ (0<x≤1), and fluorinated iron sulfate (for example, Li$_x$FeSO$_4$F (0<x≤1)).

In addition, examples of the positive electrode active material capable of obtaining a high positive electrode potential, include a sodium manganese composite oxide, a sodium nickel composite oxide, a sodium cobalt composite oxide, a sodium nickel cobalt manganese composite oxide, a sodium iron composite oxide, a sodium phosphate (for example, sodium iron phosphate and sodium vanadium phosphate), a sodium iron manganese composite oxide, a sodium nickel titanium composite oxide, a sodium nickel iron composite oxide, a sodium nickel manganese composite oxide, and the like.

Preferred examples of the positive electrode active material include an iron composite oxide (for example, Na$_y$FeO$_2$, 0≤y≤1), an iron manganese composite oxide (for example, Na$_y$Fe$_{1-x}$Mn$_x$O$_2$, 0<x<1, 0≤y≤1), a nickel titanium composite oxide (for example, Na$_y$Ni$_{1-x}$Ti$_x$O$_2$, 0<x<1, 0≤y≤1), a nickel iron composite oxide (for example, Na$_y$Ni$_{1-x}$Fe$_x$O$_2$, 0<x<1, 0≤y≤1), a nickel manganese composite oxide (for example, Na$_y$Ni$_{1-x}$Mn$_x$O$_2$, 0<x<1, 0≤y≤1), a nickel manganese iron composite oxide (for example, Na$_y$Ni$_{1-x-z}$Mn$_x$Fe$_z$O$_2$, 0<x<1, 0≤y≤1, 0<z<1, 0<1-x-z<1), and iron phosphate (for example, Na$_y$FePO$_4$, 0≤y≤1).

Particles of the positive electrode active material, can be a single primary particle, secondary particles that are an aggregate of the primary particles, or a mixture of the single primary particles and the secondary particles. The average particle diameter (the diameter) of the primary particles of the positive electrode active material, is preferably less than or equal to 10 μm, and is more preferably 0.1 μm to 5 μm. The average particle diameter (the diameter) of the secondary particles of the positive electrode active material, is preferably less than or equal to 100 μm, and is more preferably 10 μm to 50 μm.

It is preferable that at least a part of a particle surface of the positive electrode active material, is covered with a carbon material. The carbon material can be in the form of a layer structure, a particle structure, or an aggregate of particles.

Examples of the conductive agent, for increasing electron conductivity of the positive electrode active material mixture layer and for suppressing contact resistance with respect to the collector, are capable of including acetylene black, carbon black, black lead, a carbon fiber having an average fiber diameter of less than or equal to 1 μm, and the like. The type of conductive agent can be one type or two or more types.

Examples of the binding agent for binding the active material and the conductive agent together, include polytetrafluoroethylene (PTFE), polyvinylidene fluoride (PVdF), fluorine-based rubber, ethylene-butadiene rubber (SBR), polypropylene (PP), polyethylene (PE), carboxymethyl cellulose (CMC), polyimide (PI), and polyacryl imide (PAI). The type of binding agent can be one type or two or more types.

In a compounding ratio of the positive electrode active material, the conductive agent, and the binding agent, to the positive electrode active material mixture layer, it is preferable that the compounding ratio of the positive electrode active material is in a range of greater than or equal to 70 weight % and less than or equal to 95 weight %, the compounding ratio of the conductive agent is in a range of greater than or equal to 3 weight % and less than or equal to 20 weight %, and the compounding ratio of the binding agent is in a range of greater than or equal to 2 weight % and less than or equal to 10 weight %. In a case where the compounding ratio of the conductive agent is greater than or equal to 3 weight %, it is possible to make the conductivity of the positive electrode excellent, and in a case where the compounding ratio of the conductive agent is less than or equal to 20 weight %, it is possible to reduce the decomposition of the electrolyte on a conductive agent surface. In a case where the compounding ratio of the binding agent is greater than or equal to 2 weight %, it is possible to obtain a sufficient electrode strength, and in a case where the compounding ratio of the binding agent is less than or equal to 10 weight %, it is possible to decrease an insulating portion of the electrode.

The positive electrode, for example, can be produced as follows. First, the positive electrode active material, the conductive agent, and the binding agent are dispersed in a suitable solvent, and thus, slurry is prepared. The slurry is applied to the collector, and a coating film is dried, and thus, the positive electrode active material mixture layer is formed on the collector. Here, for example, the slurry may be applied to one surface on the collector, or the slurry may be applied to one surface and a rear surface on the collector. Next, the collector and the positive electrode active material mixture layer are subjected to press such as heating press, and thus, the positive electrode can be produced.

3) Electrolyte

Examples of the electrolyte include an electrolytic solution containing an aqueous solvent and a first electrolyte, and a gel-type electrolyte in which a polymer material is combined in the electrolytic solution. Such an electrolyte will be also referred to as an aqueous electrolyte. Examples of the polymer material described above, are capable of including polyvinylidene fluoride (PVdF), polyacrylonitrile (PAN), polyethylene oxide (PEO), and the like. Here, the electrolytic solution will be described. The electrolyte includes at least one type of anion selected from the group consisting of $NO_3^-$, $Cl^-$, $LiSO_4^-$, $SO_4^{2-}$, and $OH^-$. Only one type of such anions may be contained in the electrolyte, or two or more types thereof may be contained in the electrolyte. Furthermore, in order to distinguish the electrolyte as a solute from the electrolyte used to call the electrolytic solution and the gel-type electrolyte, the electrolyte as the solute will be referred to as the first electrolyte, for the sake of convenience.

A solution containing water, can be used as the aqueous solvent. Here, the solution containing water may be pure water, or may be a mixed solution or a mixed solvent of water and substances other than water.

It is preferable that in the electrolyte described above, the amount of water solvent (for example, amount of water in the aqueous solvent) is greater than or equal to 1 mol, with respect to 1 mol of a salt that is the solute. It is more preferable that the amount of water solvent is greater than or equal to 3.5 mol, with respect to 1 mol of the salt that is the solute.

An electrolyte that dissociates at the time of being dissolved in the aqueous solvent, and generates the anions described above, can be used as the first electrolyte. In particular, a lithium salt dissociating into Li ions and the anions described above is preferable. Examples of the lithium salt are capable of including $LiNO_3$, $LiCl$, $Li_2SO_4$, $LiOH$, and the like.

In addition, the lithium salt dissociating into the Li ions and the anions described above, has a comparatively high solubility in the aqueous solvent. For this reason, it is possible to obtain the electrolyte that has a high anion concentration of 1 M to 10 M, and is excellent in Li ion diffusivity.

The electrolyte having $NO_3^-$ and/or $Cl^-$, can be used in a wide range of the anion concentration of approximately 0.1 M to 10 M. From the viewpoint of compatibility between an ion conductivity and a lithium equilibrium potential, a high anion concentration of 3 M to 12 M is preferable. It is more preferable that the anion concentration of the electrolyte having $NO_3^-$ or $Cl^-$ is 8 M to 12 M.

The electrolyte having $LiSO_4^-$ and/or $SO_4^{2-}$, can be used in a range of the anion concentration of approximately 0.05 M to 2.5 M. From the viewpoint of the ion conductivity, a high anion concentration of 1.5 M to 2.5 M is preferable.

It is desirable that an $OH^-$ concentration in the electrolyte is $10^{-10}$ M to 0.1 M.

In addition, the electrolyte is capable of including both of lithium ions and sodium ions.

It is desirable that the pH of the electrolyte is greater than or equal to 4 and less than or equal to 13. In a case where the pH is less than 4, the electrolyte is acidic, and thus, the decomposition of the active material easily progresses. In a case where the pH is greater than 13, an oxygen generation overvoltage in the positive electrode decreases, and thus, the electrolysis of the aqueous solvent easily progresses.

The solute in the electrolyte, that is, the first electrolyte, for example, can be qualitatively and quantitatively determined by an ion chromatographic method. The ion chromatographic method has a high sensitivity, and thus, is particularly preferable as an analysis method.

An example of a specific measurement condition of qualitative and quantitative analysis of the solute contained in the electrolyte, according to the ion chromatographic method, is as follows:

System: Prominence HIC-SP
Analysis Column: Shim-pack IC-SA3
Guard Column: Shim-pack IC-SA3 (G)
Eluent: 3.6 mmol/L, Sodium Carbonate Aqueous Solution
Flow Rate: 0.8 mL/min
Column Temperature: 45° C.
Injected Amount: 50 µL
Detection: Electric Conductivity It is possible to confirm whether or not water is contained in the electrolyte, by gas chromatography-mass spectrometry (GC-MS) measurement. In addition, a water content in the electrolyte, for example, can be measured by light emission analysis of ICP, or the like. In addition, specific weight of the electrolyte is measured, and thus, a molar number of the solvent can be calculated. The same electrolyte or different electrolytes may be used in the positive electrode side and the negative electrode side. In this case, it is preferable that the pH of the electrolyte of the positive electrode is greater than or equal to 1 and less than or equal to 7. In a case where the pH of the electrolyte of the positive electrode is greater than or equal to 8, an oxygen generation reaction due to water electrolysis advantageously progresses, and in a case where the pH of the electrolyte of the positive electrode is less than 1, the decomposition of the active material progresses, and thus, it is not preferable. It is preferable that the pH of the electrolyte of the negative electrode is greater than or equal to 7, and in a case where the pH of the electrolyte of the negative electrode is less than 7, the hydrogen generation reaction due to the water electrolysis advantageously progresses, and thus, it is not preferable.

It is possible to add an additive to the electrolyte. For example, unsaturated alcohol or coumarin can be used. Both of the unsaturated alcohol and the coumarin may be simultaneously used. Examples of the unsaturated alcohol include 2,5-dimethyl-3-hexine-2,5-diol, 3,5-dimethyl-4-octine-3,5-diol, 3-hexine-2,5-diol, 2,4-hexadiyne-1,6-diol, propargyl alcohol, butyne-1,4-diol, methyl butynol, methyl pentynol, and dimethyl hexinediol. The unsaturated alcohol may be independently used, or a mixture of two or more types thereof can be used.

In addition, the unsaturated alcohol and the coumarin can be used along with an organic solvent. Examples of the organic solvent include alcohols such as methanol, ethanol, butanol, isobutanol, isopropyl alcohol, normal propyl alcohol, tertiary butanol, secondary butyl alcohol, 1,3-butanediol, 1,4-butanediol, 2-ethyl-1-hexanol, and benzyl alcohol, ketones such as acetone, methyl ethyl ketone, methyl isobutyl ketone, diisobutyl ketone, cyclohexanone, and diacetone alcohol, esters such as ethyl acetate, methyl acetate, butyl acetate, sec-butyl acetate, methoxy butyl acetate, amyl acetate, normal propyl acetate, isopropyl acetate, ethyl lactate, methyl lactate, butyl lactate, and ethyl 3-ethoxy propionate, ethers such as isopropyl ether, methyl cellosolve, ethyl cellosolve, butyl cellosolve, 1,4-dioxane, tetrahydrofuran, and methyl tertiary butyl ether, glycols such as ethylene glycol, diethylene glycol, triethylene glycol, propylene glycol, ethylene glycol monoethyl ether acetate, propylene glycol monomethyl ether acetate, butyl carbitol acetate, and ethyl carbitol acetate, glycol ethers such as methyl carbitol, ethyl carbitol, butyl carbitol, methyl triglycol, propylene glycol monomethyl ether, propylene glycol monobutyl ether, 3-methoxy-3-methyl-1-butanol, hexyl diglycol, propylene glycol monomethyl ether propionate, and dipropylene glycol methyl ether, glymes such as monoglyme, diglyme, ethyl glyme, ethyl diglyme, triglyme, butyl diglyme, tetraglyme, and dipropylene glycol dimethyl ether, an aprotic polar solvent such as dimethyl formamide, dimethyl acetamide, hexamethyl phosphoric triamide, acetonitrile, propionitrile, butyronitrile, isobutyronitrile, valeronitrile, isovaleronitrile, lauronitrile, 2-methyl butyronitrile, trimethyl acetonitrile, hexane nitrile, cyclopentane carbonitrile, cyclohexane carbonitrile, acrylonitrile, methacrylonitrile, crotononitrile, N-methyl-2-pyrrolidone, N-ethyl-2-pyrrolidone, and γ-butyrolactam, cyclic carboxylic esters such as gamma butyrolactone, gamma valerolactone, gamma caprolactone, and epsilon caprolactone, a chain carbonate compound such as dimethyl carbonate, diethyl carbonate, di-n-propyl carbonate, diisopropyl carbonate, n-propyl isopropyl carbonate, ethyl methyl carbonate, and methyl-n-propyl carbonate, and an amine-based solvent such as methyl amine, dimethyl amine, trimethyl amine, ethyl amine, diethyl amine, triethyl amine, ethylene diamine, triethanol amine, and N,N-diisopropyl ethyl amine. The organic solvent may be independently used, and a mixture of two or more types thereof can be used.

The unsaturated alcohol and the coumarin, and the organic solvent are simultaneously used, and thus, it is possible to simultaneously control a Zn covering film of unsaturated alcohol, and prevent water from being in contact with the negative electrode surface of the organic solvent.

In a case where a metal including Zn, or the metal A that is at least one type selected from the group consisting of Sn, Hg, In, Cd, and Pb, is used as the additive with respect to the electrolyte (the added metal), and the concentration of the metal in the electrolyte becomes excessive, it is not possible to transfer the ions between the negative electrode active material and the electrolyte due to metal precipitation, and there is a case where the battery is not operated as the secondary battery, and thus, it is necessary to be careful not to make the metal concentration in the electrolyte excessive. In addition, it is necessary to be careful not to allow the pH of the electrolyte to greatly fluctuate by adding a metal. Zn may be added at the time of producing the slurry of the negative electrode, may be added to the electrolyte, or both adding methods may be simultaneously used. However, when Hg is used, Hg is mixed along with an active material, a conductive assistant, and a binder, at the time of producing the negative electrode. The added metal may be in the form of a metal single body, or may be in the form any one of an oxide, a chloride, a sulfide, a nitrate, a sulfate, and a hydroxide salt, or a combination of two or more thereof. In addition, the added metal is capable of existing in the electrolyte as an ion or a solid.

It is possible to examine whether or not the unsaturated alcohol or the organic solvent is contained in the electrolyte, by using a liquid chromatography or GC-MS described above. For example, the electrolyte is distilled, and thus, the organic solvent in the electrolyte is separated. GC-MS and nuclear magnetic resonance measurement (NMR) are performed with respect to the separated organic solvent, and thus, it is possible to specify the organic solvent. In addition, the added metal can be examined by ICP.

4) Separator

It is possible to arrange a separator between the positive electrode and the negative electrode. The separator is configured of an insulating material, and thus, it is possible to prevent the positive electrode and the negative electrode from being in electrically contact with each other. In addition, it is desirable to use a separator in the shape where the electrolyte can be moved between the positive electrode and the negative electrode. Examples of the separator include a non-woven fabric, a film, paper, and the like. Examples of a configuration material of the separator, include polyolefin such as polyethylene or polypropylene, and cellulose. Preferred examples of the separator are capable of including a non-woven fabric containing a cellulose fiber, and a porous film containing a polyolefin fiber. It is preferable that the porosity of the separator is greater than or equal to 60%. In addition, it is preferable that a fiber diameter is less than or equal to 10 μm. The compatibility of the separator with respect to the electrolyte is improved by setting the fiber diameter to be less than or equal to 10 μm, and thus, it is possible to decrease battery resistance. It is more preferable that the fiber diameter is in a range of less than or equal to 3 μm. A cellulose fiber-containing non-woven fabric, having a porosity of greater than or equal to 60%, is excellent in impregnation properties of the electrolyte, and is capable of exhibiting high output performance at a low temperature to a high temperature. In addition, the cellulose fiber-containing non-woven fabric does not react with the negative electrode even in long-term charge storage, float charge, and overcharge, and a short circuit between the negative electrode and the positive electrode due to dendrite precipitation of a lithium metal does not occur. It is more preferable that the porosity is in a range of 62% to 80%.

In addition, a solid electrolyte can be used as the separator. Oxides such as LATP having an NASICON type skeleton $(Li_{1+x}Al_xTi_{2-x}(PO_4)_3;\ 0.1 \leq x \leq 0.4)$, amorphous LIPON $(Li_{2.9}PO_{3.3}N_{0.46})$, and garnet type LLZ $(Li_7La_3Zr_2O_{12})$, are preferable as the solid electrolyte.

In addition, it is possible to include β alumina, $Na_{1+x}Zr_2Si_xP_{3-x}O_{12}$ $(0 \leq x \leq 3)$, $NaAlSi_3O_8$, and the like.

It is preferable that the thickness of the separator is greater than or equal to 20 μm and less than or equal to 100 μm, and the density of the separator is greater than or equal to 0.2 g/cm$^3$ and less than or equal to 0.9 g/cm$^3$. According to such a range, it is possible to keep a balance between the mechanical strength and a reduction in the battery resistance, and to provide the secondary battery in which an internal short circuit is suppressed at high output. In addition, thermal contraction of the separator in a high temperature environment is small, and excellent high temperature storage performance can be exhibited.

5) Container

A metallic container, a container of a laminated film, and a resin container of polyethylene, polypropylene, or the like, can be used as a container in which the positive electrode, the negative electrode, and the electrolyte are contained.

A metal can formed of nickel, iron, stainless steel, zinc, and the like, in the shape of a square and a tube, can be used as the metallic container.

A plate thickness of each of the resin container and the metallic container, is desirably in a range of less than or equal to 1 mm, and is more preferably in a range of less than or equal to 0.5 mm. It is even more preferable that the plate thickness is in a range of less than or equal to 0.3 mm. In addition, it is desirable that the lower limit value of the plate thickness is 0.05 mm.

Examples of the laminated film are capable of including a multi-layer film in which a metal layer is covered with a resin layer, and the like. Examples of the metal layer include a stainless steel foil, an aluminum foil, and an aluminum alloy foil. Polymers such as polypropylene (PP), polyethylene (PE), nylon, and polyethylene terephthalate (PET), can be used as the resin layer. It is preferable that the thickness of the laminated film is in a range of less than or equal to 0.5 mm. It is more preferable that the thickness of the laminated film is in a range of less than or equal to 0.2 mm. In addition, it is desirable that the lower limit value of the thickness of the laminated film is 0.01 mm.

The secondary battery according to the embodiment, can be applied to a secondary battery in various forms such as a square, a tube, a flat type, a thin type, and a coin type. Further, a secondary battery having a bipolar structure is preferable. Accordingly, there is an advantage that plurality of serial cells can be produced as one cell.

An example of the secondary battery according to the embodiment will be described with reference to FIG. 3 to FIG. 6.

Figure 3:
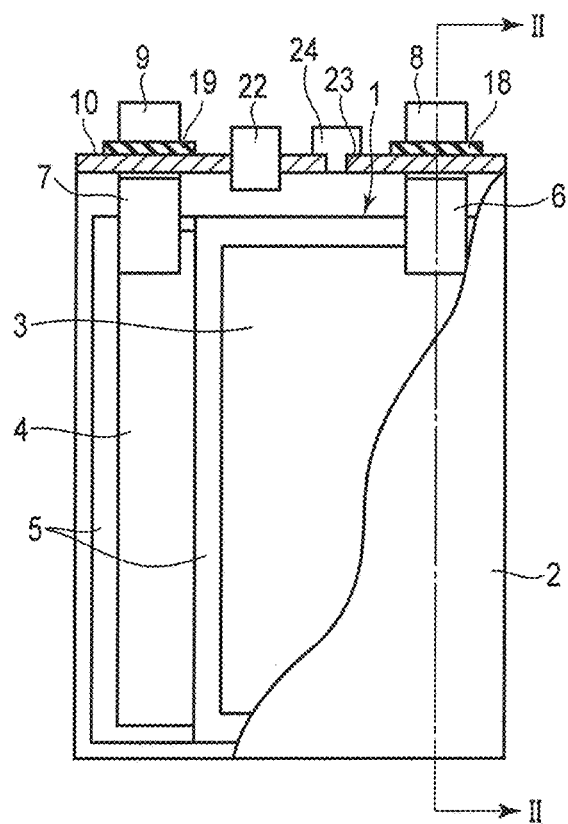
FIG. 3 is a partially cutout sectional view of a secondary battery according to a second embodiment.
Figure 4:
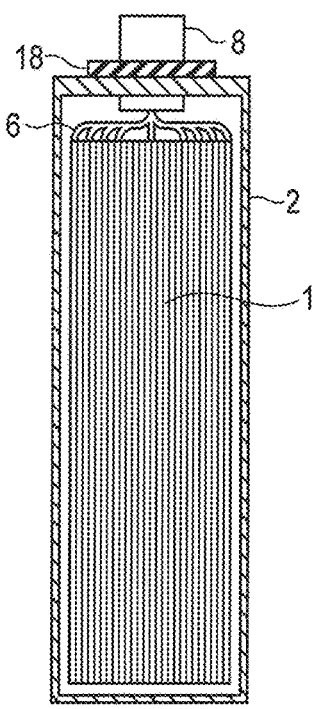
FIG. 4 is a side view with respect to the battery of FIG. 3.

In FIG. 3 and FIG. 4, an example of the secondary battery using the metallic container is illustrated.

An electrode group 1 is stored in a rectangular tubular metallic container 2. The electrode group 1 has a structure in which a positive electrode 3 and a negative electrode 4 are wound into the shape of a flat spiral, through a separator 5. The electrolyte (not illustrated) is retained in the electrode group 1. As illustrated in FIG. 4, a strip-like positive electrode lead 6 is electrically connected to each of a plurality of spots of an end portion of the positive electrode 3 positioned on an end surface of the electrode group 1. In addition, a strip-like negative electrode lead 7 is electrically connected to each of the plurality of spots of the end portion of the negative electrode 4 positioned on the end surface. A plurality of positive electrode leads 6 are electrically connected to a positive electrode conductive tab 8, in a state of being bundled together. The positive electrode terminal is configured of the positive electrode lead 6 and the positive electrode conductive tab 8. In addition, the negative electrode leads 7 are connected to a negative electrode conductive tab 9, in a state of being bundled together. The negative electrode terminal is configured of the negative electrode lead 7 and the negative electrode conductive tab 9. The metallic sealing plate 10 is fixed to an opening portion of the metallic container 2, by welding or the like. The positive electrode conductive tab 8 and the negative electrode conductive tab 9 are respectively drawn from a take-out hole provided on a sealing plate 10, to the outside. An inner circumferential surface of each of the take-out holes on the sealing plate 10, is covered with insulating members 18 and 19 in order to avoid a short circuit due to contact between the positive electrode conductive tab 8 and the negative electrode conductive tab 9.

Figure 5:
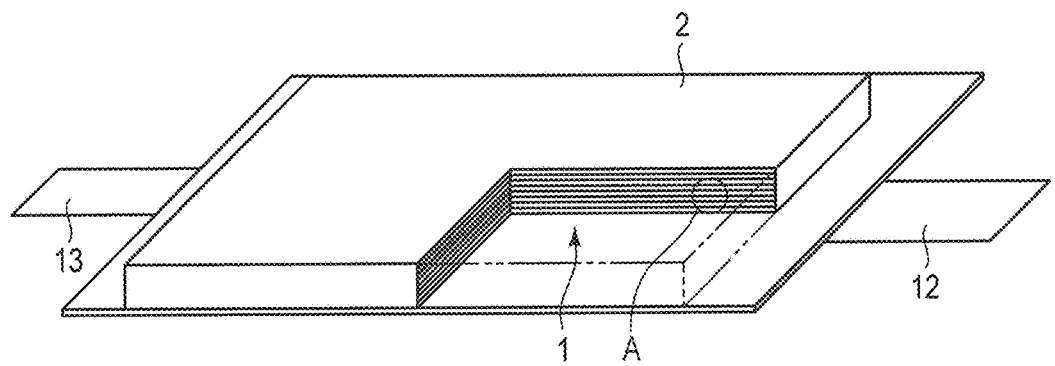
FIG. 5 is a partially cutout perspective view illustrating the secondary battery according to the second embodiment.
Figure 6:
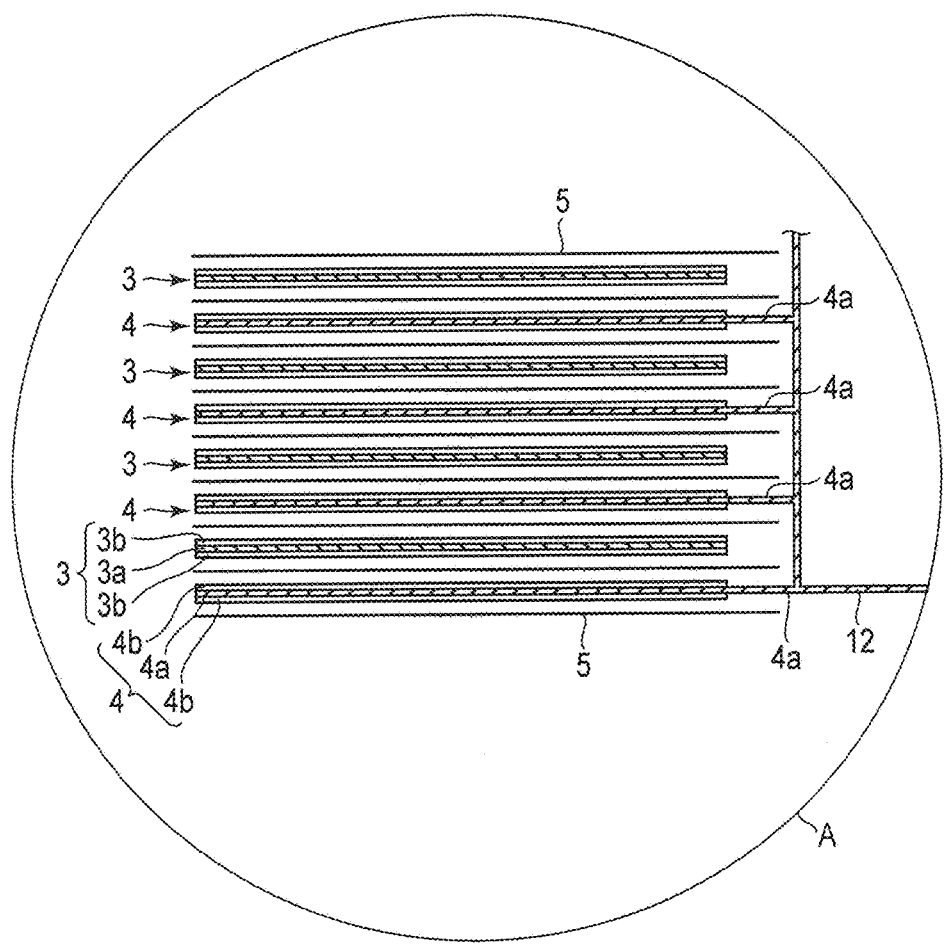
FIG. 6 is an enlarged sectional view of a portion A of FIG. 5.

In FIG. 5 and FIG. 6, an example of the secondary battery using the exterior member of the laminated film, is illustrated.

A laminated electrode group 1 is stored in a pouched container 2 formed of a laminated film in which a metal layer is interposed between two resin films. As illustrated in FIG. 6, the laminated electrode group 1 has a structure in which the positive electrode 3 and the negative electrode 4 are alternately laminated through the separator 5. There are a plurality of positive electrodes 3, and each of the plurality of positive electrodes 3 include a collector 3a, and a positive electrode active material mixture layer 3b formed on both surfaces of the collector 3a. There are a plurality of negative electrodes 4, and each of the plurality of negative electrodes 4 includes a collector 4a, and a negative electrode active material mixture layer 4b formed on both surfaces of the collector 4a. One side of the collector 4a of each of the negative electrodes 4, protrudes from the positive electrode 3. The protruding collector 4a is electrically connected to a strip-like negative electrode terminal 12. A tip end of the strip-like negative electrode terminal 12 is drawn from the container 2 to the outside. In addition, even though it is not illustrated, in the collector 3a of the positive electrode 3, a side positioned on a side opposite to a protruding side of the collector 4a protrudes from the negative electrode 4. The collector 3a protruding from the negative electrode 4 is electrically connected to a strip-like positive electrode terminal 13. A tip end of the strip-like positive electrode terminal 13 is positioned on a side opposite to the negative electrode terminal 12, and is drawn from a side of the container 2 to the outside.

In the secondary battery illustrated in FIG. 3 to FIG. 6, a safety valve, for releasing hydrogen gas generated in the container to the outside, can be provided. Any one of a return type safety valve that is operated in a case where the internal pressure is higher than a setting value, and functions as a sealing plug in a case where the internal pressure decreases, and a non-return type safety valve in which the function as the sealing plug is not recovered in a case where the valve is operated once, can be used as the safety valve. In addition, the secondary battery illustrated in FIG. 3 to FIG. 6, is a closed secondary battery, but in the case of including a circulation system for returning hydrogen gas to water, the secondary battery can be an open system.

According to the embodiment described above, it is possible to provide the secondary battery. The secondary battery includes the electrode according to the first embodiment, and thus, the surface of the active material of the electrode is covered with Zn having a high hydrogen overvoltage, and the hydrogen generation due to the water decomposition on the surface, can be suppressed. Accordingly, the secondary battery according to this embodiment is possible to improve the charge and discharge efficiency and the self-discharge characteristic.

Third Embodiment

According to a third embodiment, it is possible to provide an assembled battery in which the secondary battery is set to a unit cell. The secondary battery of the second embodiment can be used as the secondary battery.

Examples of the assembled battery are capable of including an assembled battery including a plurality of unit cells electrically connected in series or in parallel as configuration unit, an assembled battery including a unit that includes a plurality of unit cells electrically connected in series or a unit that includes a plurality of unit cells electrically connected in parallel, and the like.

The assembled battery may be contained in a housing. A metal can formed of an aluminum alloy, iron, stainless steel, or the like, a plastic container, and the like, can be used as the housing. In addition, it is desirable that a plate thickness of the container is greater than or equal to 0.5 mm.

Examples of a form, in which a plurality of secondary batteries are electrically connected in series or in parallel, include a form in which the plurality of secondary batteries respectively including the containers are electrically connected in series or in parallel, and a form in which a plurality of electrode groups contained in the common housing are electrically connected in series or in parallel. In a specific example of the former, the positive electrode terminals and the negative electrode terminals of the plurality of secondary batteries are connected through a metallic bus bar (for example, aluminum, nickel, and copper) In a specific example of the latter, the plurality of electrode groups are contained in one housing, in a state of being electrochemically insulated by a partition wall, and the electrode groups are electrically connected in series. By setting the number of batteries electrically connected in series to be in a range of 5 to 7, voltage interchangeability with respect to a lead storage battery becomes excellent. In order to further increase the voltage interchangeability with respect to the lead storage battery, it is preferable that 5 or 6 unit cells are connected in series.

Figure 7:
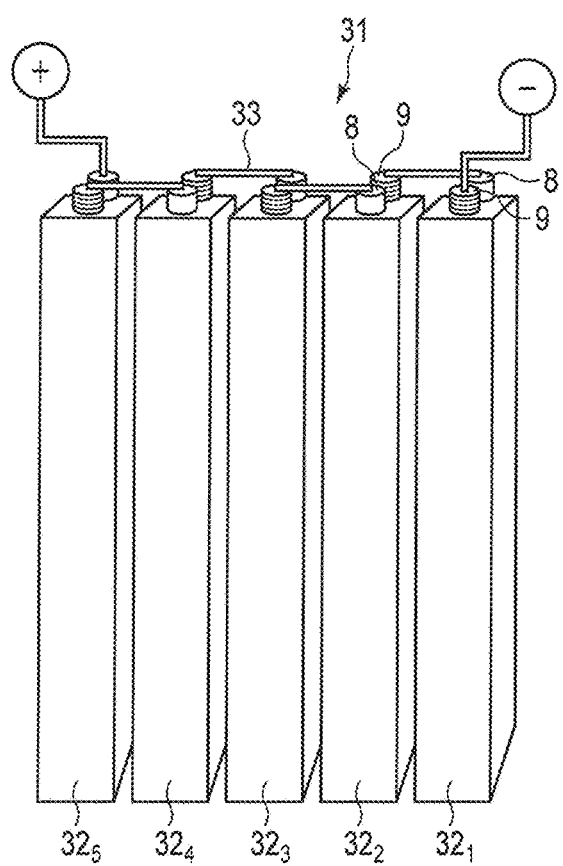
FIG. 7 is a perspective view illustrating an example of an assembled battery according to a third embodiment.

An example of the assembled battery will be described with reference to FIG. 7. An assembled battery 31 illustrated in FIG. 7, includes a plurality of square secondary batteries $32_1$ to $32_5$ according to the second embodiment (for example, FIG. 3, FIG. 4), as the unit cell. The positive electrode conductive tab 8 of the battery $32_1$, and the negative electrode conductive tab 9 of the battery $32_2$ positioned adjacent thereto, are electrically connected through a lead 33. Further, the positive electrode conductive tab 8 of the battery $32_2$, and the negative electrode conductive tab 9 of the battery $32_3$ positioned adjacent thereto, are electrically connected through the lead 33. Thus, the batteries $32_1$ to $32_5$ are connected in series.

According to the assembled battery of the third embodiment, the secondary battery according to the second embodiment is provided, and thus, it is possible to provide the assembled battery in which the charge and discharge efficiency and the self-discharge characteristic are improved.

Fourth Embodiment

According to a fourth embodiment, a battery pack is provided. The battery pack includes the secondary battery according to the second embodiment.

The battery pack according to the fourth embodiment is capable of including one or plurality of secondary batteries (unit cells) according to the second embodiment, described above. The plurality of secondary batteries included in the battery pack according to the fourth embodiment, can be electrically connected in series, in parallel, or in a combination of serial connection and parallel connection. In addition, the plurality of secondary batteries are capable of configuring assembled batteries electrically connected together. In a case where the assembled battery is configured of the plurality of secondary batteries, it is possible to use the assembled battery of the third embodiment.

The battery pack according to the fourth embodiment, is capable of further including a protective circuit. The protective circuit controls charge and discharge of the secondary battery. Alternatively, a circuit included in a device (for example, an electronic device, an automobile, or the like) using the battery pack as a power source, can be used as the protective circuit of the battery pack.

In addition, the battery pack according to the fourth embodiment, is capable of further including an external terminal for energization. The external terminal for energization outputs a current from the secondary battery to the outside, and/or inputs a current into the unit cell 51. In other words, when the battery pack is used as the power source, a current is supplied to the outside through the external terminal for energization. In addition, when the battery pack is charged, a charge current (including regeneration energy of power of an automobile or the like) is supplied to the battery pack through the external terminal 59 for energization.

Figure 8:
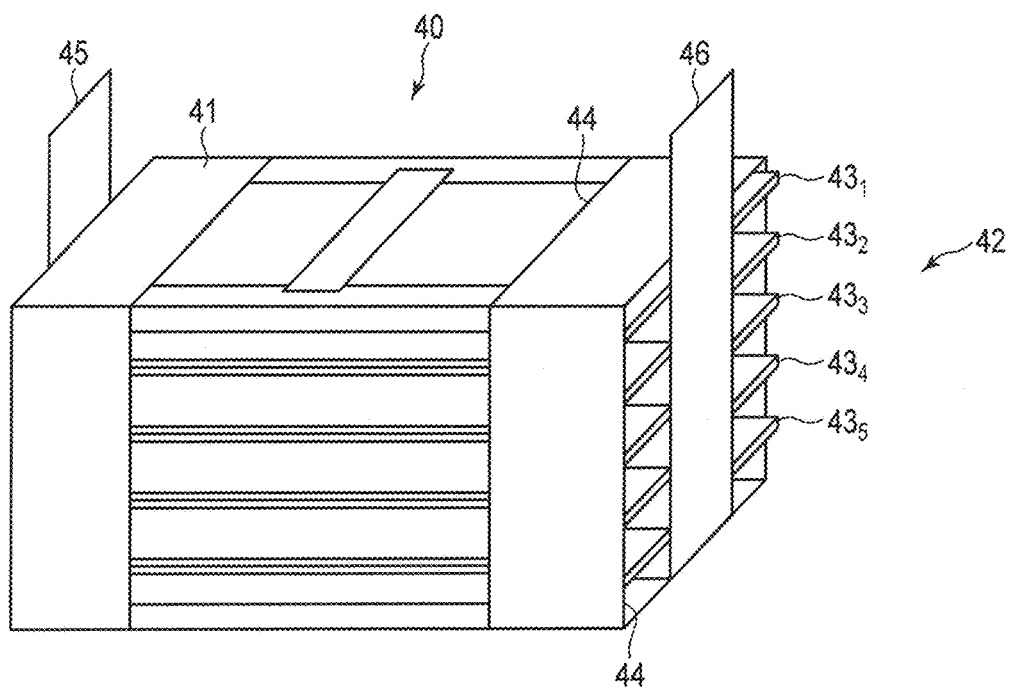
FIG. 8 is a perspective view illustrating an example of a battery pack according to a fourth embodiment.

An example of the battery pack according to the fourth embodiment will be described with reference to FIG. 8. FIG. 8 is a schematic perspective view illustrating an example of the battery pack.

A battery pack 40 includes the assembled battery formed of the secondary battery illustrated in FIGS. 5 and 6. The battery pack 40 includes a housing 41, and an assembled battery 42 contained in the housing 41. In the assembled battery 42, a plurality of (for example, five) secondary batteries $43_1$ to $43_5$ are electrically connected in series. The secondary batteries $43_1$ to $43_5$ are laminated in a thickness direction. The housing 41 includes an upper portion and an opening portion 44 on each of four lateral surfaces. The lateral surfaces on which positive electrode terminal 13 and the negative electrode terminal 12 of the secondary batteries $43_1$ to $43_5$ protrudes, is exposed to the opening portion 44 of the housing 41. An output positive electrode terminal 45 of the assembled battery 42 is in the shape of a strip, and one end is electrically connected to the positive electrode terminal 13 of any one of the secondary batteries $43_1$ to $43_5$, and the other end protrudes from the opening portion 44 of the housing 41, and protrudes from the upper portion of the housing 41. On the other hand, an output negative electrode terminal 46 of the assembled battery 42 is in the shape of a strip, and one end is electrically connected to the negative electrode terminal 12 of any one of the secondary batteries $43_1$ to $43_5$, and the other end protrudes from the opening portion 44 of the housing 41, and protrudes from the upper portion of the housing 41.

Figure 9:
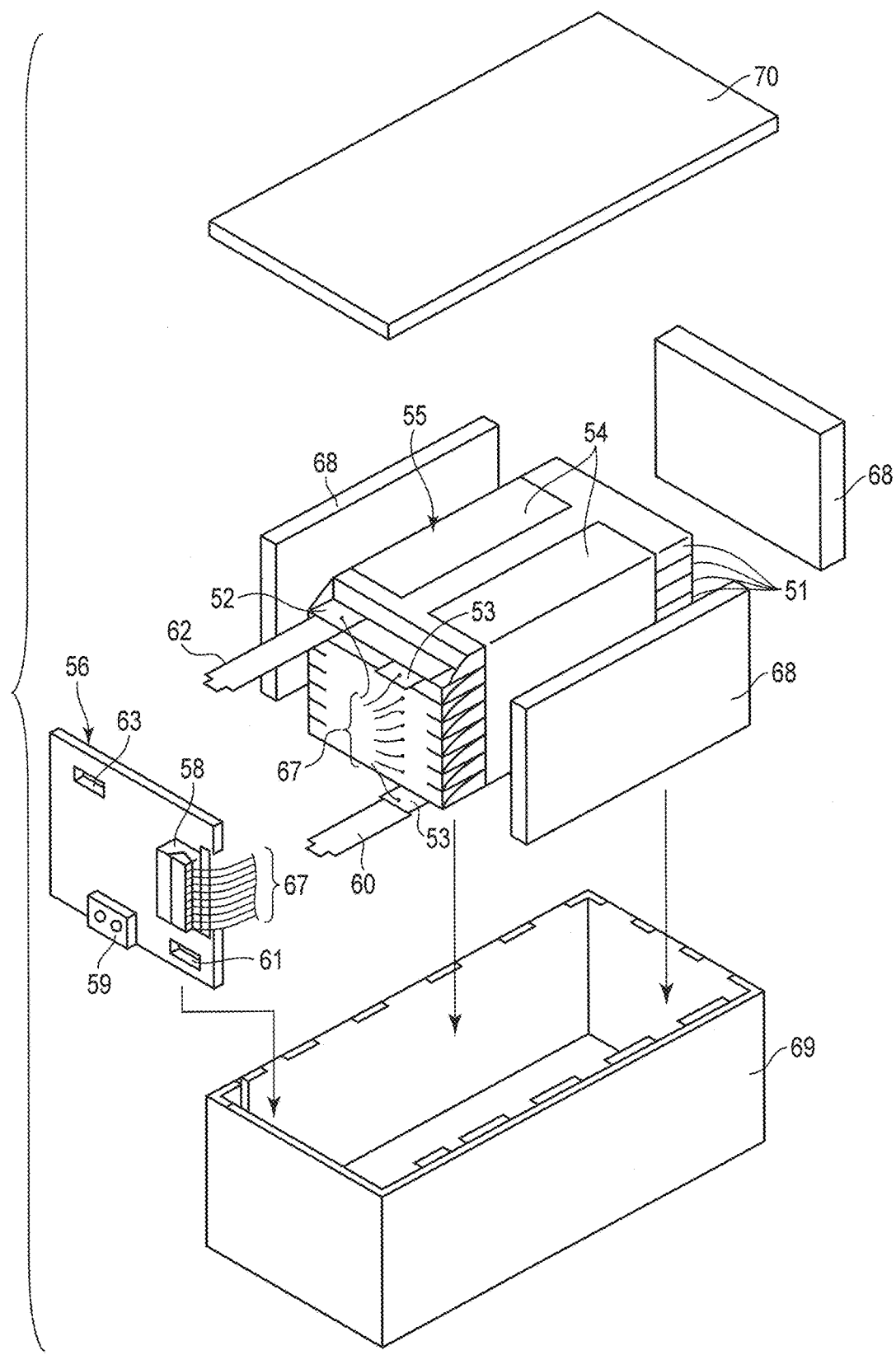
FIG. 9 is an exploded perspective view of another example of a battery pack according to the fourth embodiment.
Figure 10:
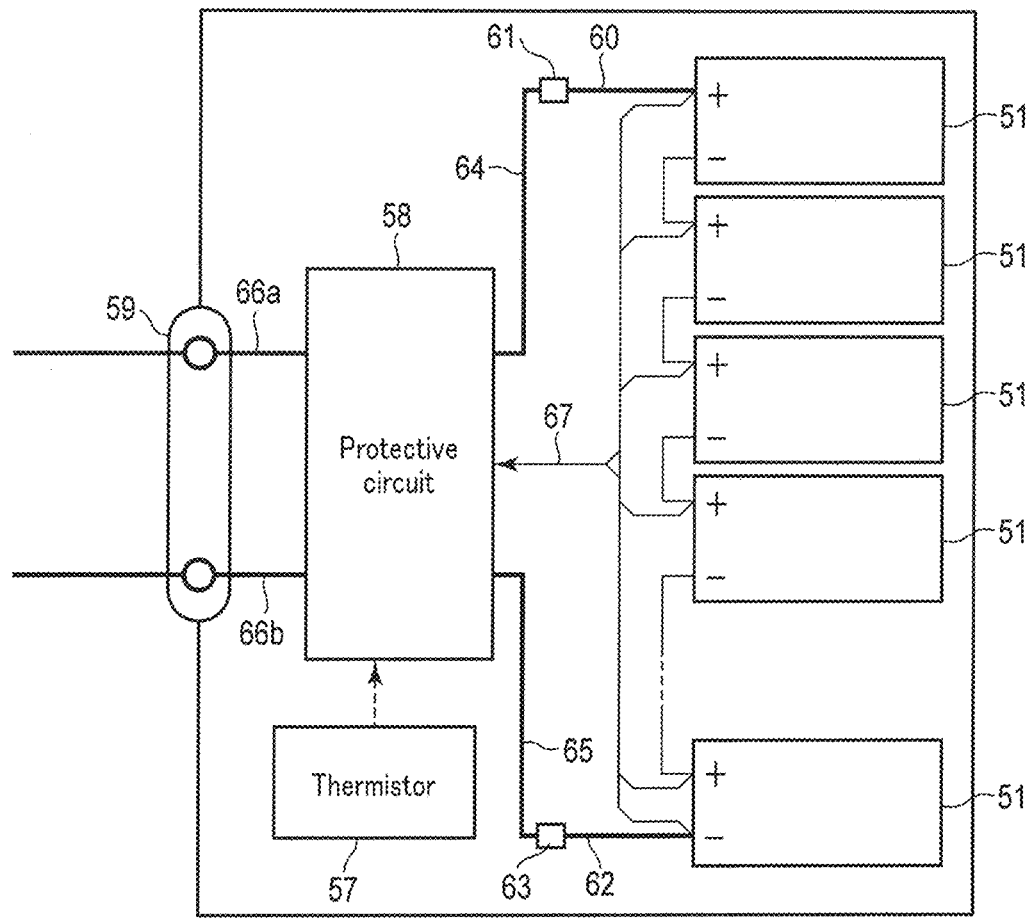
FIG. 10 is a block diagram illustrating an electric circuit of the battery pack of FIG. 9.

Another example of the battery pack according to the fourth embodiment will be described in detail, with reference to FIG. 9 and FIG. 10. FIG. 9 is an exploded perspective view of the battery pack of another example according to the fourth embodiment. FIG. 10 is a block diagram illustrating an electric circuit of the battery pack of FIG. 9.

A plurality of unit cells 51 configured of a flat secondary battery, are laminated such that a negative electrode terminal 52 and a positive electrode terminal 53, extending to the outside, are aligned in the same direction, and are fastened by a pressure-sensitive adhesive tape 54, and thus, an assembled battery 55 is configured. Such unit cells 51 are electrically connected to each other in series, as illustrated in FIG. 10.

A printed wiring board 56 is arranged to face a lateral surface of the unit cell 51, on which the negative electrode terminal 52 and the positive electrode terminal 53 extend. As illustrated in FIG. 10, a thermistor 57, a protective circuit 58, and an external terminal 59 for energization, are mounted on the printed wiring board 56. Furthermore, an insulating plate (not illustrated), for avoiding unnecessary connection with respect to the wiring of the assembled battery 55, is attached onto the surface of the printed wiring board 56, facing the assembled battery 55.

A positive electrode lead 60 is connected to the positive electrode terminal 53 positioned on the lowermost layer of the assembled battery 55, and a tip end of the positive electrode lead 60 is inserted and electrically connected to a positive electrode connector 61 of the printed wiring board 56. A negative electrode lead 62 is connected to the negative electrode terminal 52 positioned on the uppermost layer of the assembled battery 55, and a tip end of the negative electrode lead 62 is inserted and electrically connected to a negative electrode connector 63 of the printed wiring board 56. The connectors 61 and 63 are connected to the protective circuit 58 through wirings 64 and 65 formed on the printed wiring board 56.

The thermistor 57 detects the temperature of the unit cell 51, and transmits a detection signal to the protective circuit 58. The protective circuit 58 is capable of blocking plus wiring 66a and minus wiring 66b between the protective circuit 58 and the external terminal 59 for energization in a predetermined condition. The predetermined condition, for example, is a time when the detected temperature of the thermistor 57 is higher than or equal to a predetermined temperature. In addition, the predetermined condition is a time when the overcharge, the overdischarge, the overcurrent, or the like of the unit cell 51 is detected. The overcharge or the like is detected with respect to each of the unit cells 51 or the assembled battery 55. In a case where each of the unit cells 51 is detected, a battery voltage may be detected, or a positive electrode potential or a negative electrode potential may be detected. In the case of the latter, a lithium electrode used as a reference electrode, is inserted into each of the unit cells 51. In the case of FIG. 9 and FIG. 10, a wiring 67 for detecting a voltage, is connected to each of the unit cells 51, and the detection signal is transmitted to the protective circuit 58 through the wiring 67.

A protective sheet 68 formed of rubber or a resin is arranged on each of three lateral surfaces of the assembled battery 55, excluding the lateral surface on which the positive electrode terminal 53 and the negative electrode terminal 52 protrude.

The assembled battery 55 is stored in a storage container 69, along with each of the protective sheet 68 and the printed wiring board 56. That is, the protective sheet 68 is arranged on each of both inner side surfaces of the storage container 69 in a long side direction, and an inner side surface in a short side direction, and the printed wiring board 56 is arranged on the opposite inner side surface in the short side direction. The assembled battery 55 is positioned in a space surrounded by the protective sheet 68 and the printed wiring board 56. A lid 70 is attached to an upper surface of the storage container 69.

Furthermore, the assembled battery 55 may be fixed by using a thermal contraction tape instead of the pressure-sensitive adhesive tape 54. In this case, the protective sheet is arranged on both lateral surfaces of the assembled battery, and is wound with the thermal contraction tape, and then, the thermal contraction tape is subjected to thermal contraction, and thus, the assembled battery is solidified.

In FIG. 9 and FIG. 10, the unit cells 51 are formed by being connected in series, but may be connected in parallel in order to increase battery capacity. Alternatively, serial connection and parallel connection may be combined. Further, the combined battery packs can be connected in series and/or in parallel.

In addition, the mode of the battery pack is suitably changed according to the application. An application in which charge and discharge at a large current is required, is preferable as the application of the battery pack. Specifically, examples of the application of the battery pack, include an application for a power source of a digital camera, an in-car application for a vehicle such as a hybrid electric vehicle of two wheels to four wheels, an electric vehicle of two wheels to four wheels, an assist bicycle, and a railroad vehicle, and an application as a stationary battery. In particular, the in-car application is preferable.

In a vehicle such as an automobile on which the battery pack according to the fourth embodiment is mounted, the battery pack, for example, collects the regeneration energy of the power of the vehicle.

According to the battery pack of the fourth embodiment, as described above, the secondary battery of the second embodiment is provided, and thus, it is possible to provide the battery pack in which the charge and discharge efficiency and the self-discharge characteristic are improved.

Fifth Embodiment

According to a fifth embodiment, a vehicle is provided. The battery pack according to the fourth embodiment is mounted on the vehicle.

In the vehicle according to the fifth embodiment, the battery pack, for example, collects the regeneration energy of the power of the vehicle.

Examples of the vehicle according to the fifth embodiment include a hybrid electric vehicle of two wheels to four wheels, an electric vehicle of two wheels to four wheels, an assist bicycle, and a railroad vehicle.

A mounting position of the battery pack on the vehicle according to the fifth embodiment, is not particularly limited. For example, in a case where the battery pack is mounted on an automobile, the battery pack can be mounted in an engine room of a vehicle, in a rear portion of a vehicle body, or under seats.

Next, an example of the vehicle according to the fifth embodiment will be described with reference to the drawings.

Figure 11:
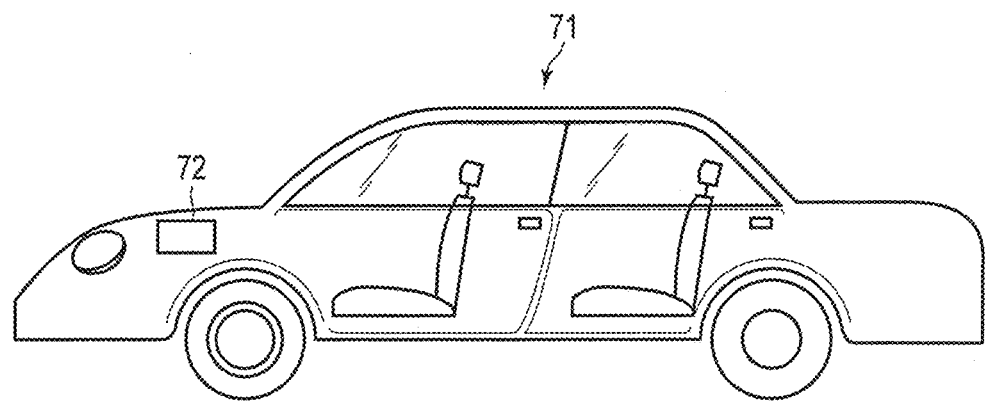
FIG. 11 is sectional view schematically illustrating a vehicle of an example according to a fifth embodiment.

FIG. 11 is a sectional view schematically illustrating an example of the vehicle according to the fifth embodiment.

A vehicle 71 illustrated in FIG. 11, includes a vehicle main body and a battery pack 72. The battery pack 72 can be the battery pack according to the fourth embodiment.

The vehicle 71 illustrated in FIG. 11, is an automobile of four wheels. For example, a hybrid electric vehicle of two wheels to four wheels, an electric vehicle of two wheels to four wheels, an assist bicycle, and a railroad vehicle can be used as the vehicle 71.

A plurality of battery packs 72 may be mounted on the vehicle 71. In this case, the battery packs 72 may be connected in series, may be connected in parallel, or may be connected in a combination of serial connection and parallel connection.

The battery pack 72 may be mounted in an engine room positioned in a front portion of a vehicle main body. A mounting position of the battery pack 72 is not particularly limited. The battery pack 72 may be mounted in a rear portion of the vehicle main body or under seats. The battery pack 72 can be used as a power source of the vehicle 71. In addition, the battery pack 72 is capable of collecting the regeneration energy of the power of the vehicle 71.

Next, the embodiment of the vehicle according to the fifth embodiment will be described with reference to FIG. 12.

FIG. 12 is a diagram schematically illustrating another example of the vehicle according to the fifth embodiment. A vehicle 300 illustrated in FIG. 12, is an electric vehicle.

The vehicle 300 illustrated in FIG. 12, includes a vehicle main body 301, a vehicle power source 302, a vehicle electric control unit (ECU) 380 that is a master control means of the vehicle power source 302, an external terminal (a terminal for connection with respect to an external power source) 370, an inverter 340, and a driving motor 345.

In the vehicle 300, the vehicle power source 302, for example, is mounted in the engine room, in the rear portion of the vehicle body of the automobile, or under the seats. Furthermore, in the vehicle 300 illustrated in FIG. 12, a mounting spot of the vehicle power source 302 is schematically illustrated.

The vehicle power source 302 includes a plurality of (for example, three) battery packs 312a, 312b, and 312c, a battery management unit (BMU) 311, and a communication bus 310.

Three battery packs 312a, 312b, and 312c are electrically connected in series. The battery pack 312a includes an assembled battery 314a and an assembled battery monitoring device (voltage temperature monitoring (VTM)) 313a. The battery pack 312b includes an assembled battery 314b and an assembled battery monitoring device 313b. The battery pack 312c includes an assembled battery 314c and an assembled battery monitoring device 313c. The battery packs 312a, 312b, and 312c can be each independently demounted, and can be exchanged with another battery pack 312.

Each of the assembled batteries 314a to 314c, includes a plurality of unit cells connected in series. At least one of the plurality of unit cells is the secondary battery according to the second embodiment. Each of the assembled batteries 314a to 314c, performs charge and discharge through a positive electrode terminal 316 and a negative electrode terminal 317.

In order to collect information relevant to the maintenance of the vehicle power source 302, the battery management unit 311 performs communication in the assembled battery monitoring devices 313a to 313c, and collects information relevant to the voltage, the temperature, and the like of the unit cell of the assembled batteries 314a to 314c included in the vehicle power source 302.

A communication bus 310 is connected between the battery management unit 311 and the assembled battery monitoring devices 313a to 313c. The communication bus 310 is configured such that one set of communication lines is shared in a plurality of nodes (the battery management unit and one or more assembled battery monitoring devices). The communication bus 310, for example, is a communication bus configured on the basis of a control area network (CAN) standard.

The assembled battery monitoring devices 313a to 313c measure the voltage and the temperature of each of the unit cells configuring the assembled batteries 314a to 314c, on the basis of a command according to the communication from the battery management unit 311. However, the temperature can be measured in several spots per one assembled battery, and the temperature of all of the unit cells may not be measured.

The vehicle power source 302 is capable of including an electromagnetic contactor (for example, a switch device 333 illustrated in FIG. 12) for turning on and off the connection between the positive electrode terminal 316 and the negative electrode terminal 317. The switch device 333 includes a precharge switch (not illustrated) that is turned on when the assembled batteries 314a to 314c are charged, and a main switch (not illustrated) that is turned on when battery output is supplied to a load. The precharge switch and the main switch include a relay circuit (not illustrated) that is turned on and off according to a signal supplied to a coil arranged in the vicinity of a switch element.

The inverter 340 converts an input direct current voltage, into a high voltage of a three-phase alternate current (AC) for driving a motor. A three-phase output terminal of the inverter 340 is connected to each three-phase input terminal of the driving motor 345. The inverter 340 controls an output voltage, on the basis of a control signal from the battery management unit 311 or the vehicle ECU 380 for controlling the entire operation of vehicle.

The driving motor 345 is rotated by power supplied from the inverter 340. The rotation, for example, is transferred to an axle and a driving wheel W through a differential gear unit.

In addition, even though it is not illustrated, the vehicle 300 includes a regeneration brake mechanism. The regeneration brake mechanism rotates the driving motor 345 at the time of braking the vehicle 300, and converts kinetic energy into regeneration energy as electric energy. The regeneration energy collected in the regeneration brake mechanism is input into the inverter 340, and is converted into a direct current. The direct current is input into the vehicle power source 302.

One terminal of a connection line L1 is connected to the negative electrode terminal 317 of the vehicle power source 302, through a current detection unit (not illustrated) in the battery management unit 311. The other terminal of the connection line L1 is connected to a negative electrode input terminal of the inverter 340.

One terminal of a connection line L2 is connected to the positive electrode terminal 316 of the vehicle power source 302, through the switch device 333. The other terminal of the connection line L2 is connected to a positive electrode input terminal of the inverter 340.

The external terminal 370 is connected to the battery management unit 311. The external terminal 370, for example, can be connected to the external power source.

The vehicle ECU 380 manages the entire vehicle, by performing cooperative control with respect to the battery management unit 311, along with the other device, in response to manipulation input of a driver or the like. Data relevant to the maintenance of the vehicle power source 302, such as the remaining capacity of the vehicle power source 302, is transferred between the battery management unit 311 and the vehicle ECU 380, through a communication line.

The vehicle according to the fifth embodiment, includes the battery pack according to the fourth embodiment. That is, the battery pack having a high charge and discharge efficiency and high storage performance is provided, and thus, the vehicle according to the fifth embodiment is excellent in the charge and discharge efficiency and the self-discharge characteristic, and the battery pack is excellent in the life performance, and therefore, it is possible to provide the vehicle having high reliability.

Sixth Embodiment

According to a sixth embodiment, a stationary power source is provided. The battery pack according to the fourth embodiment is mounted on the stationary power source. Furthermore, the assembled battery according to the third embodiment or the secondary battery according to the second embodiment may be mounted on the stationary power source, instead of the battery pack according to the fourth embodiment.

The battery pack according to the fourth embodiment is mounted on the stationary power source according to the sixth embodiment. Therefore, the stationary power source according to the sixth embodiment is capable of realizing long service life.

FIG. 13 is a block diagram illustrating an example of a system including the stationary power source according to the sixth embodiment. FIG. 13 is a diagram illustrating an application example with respect to stationary power sources 112 and 123, as a usage example of battery packs 40A and 40B according to the fourth embodiment. In an example illustrated in FIG. 13, a system 110, in which the stationary power sources 112 and 123 are used, is illustrated. The system 110 includes a power generation station 111, a stationary power source 112, a customer side power system 113, and an energy management system (EMS) 115. In addition, a power network 116 and a communication network 117 are formed in the system 110, and the power generation station 111, the stationary power source 112, the customer side power system 113, and the EMS 115 are connected through the power network 116 and the communication network 117. The EMS 115 performs control such that the entire system 110 is stabilized, by utilizing the power network 116 and the communication network 117.

The power generation station 111 generates large-capacity power by a fuel source of heating power, atomic power, and the like. The power is supplied from the power generation station 111 through the power network 116 or the like. In addition, the battery pack 40A is mounted in the stationary power source 112. The battery pack 40A is capable of storing the power or the like, supplied from the power generation station 111. In addition, the stationary power source 112 is capable of supplying the power stored in the battery pack 40A, through the power network 116 or the like. The power conversion device 118 is provided in the system 110. The power conversion device 118 includes a converter, an inverter, a voltage transformer, and the like. Therefore, the power conversion device 118 is capable of performing conversion between a direct current and an alternate current, conversion between alternate currents having frequency different from each other, voltage transformation (step-up and step-down), and the like. For this reason, the power conversion device 118 is capable of converting the power from the power generation station 111, into power storable in the battery pack 40A.

The customer side power system 113 includes a power system for a plant, a power system for a building, a power system for domestic use, and the like. The customer side power system 113 includes a customer side EMS 121, a power conversion device 122, and a stationary power source 123. The battery pack 40B is mounted in the stationary power source 123. The customer side EMS 121 performs control such that the customer side power system 113 is stabilized.

The power from the power generation station 111 and the power from the battery pack 40A are supplied to the customer side power system 113, through the power network 116. The battery pack 40B is capable of storing the power supplied to the customer side power system 113. In addition, the power conversion device 122 includes a converter, an inverter, a voltage transformer, and the like, as with the power conversion device 118. Therefore, the power conversion device 122 is capable of performing conversion between a direct current and an alternate current, conversion between alternate currents having frequency different from each other, voltage transformation (step-up and step-down), and the like. For this reason, the power conversion device 122 is capable of converting the power supplied to the customer side power system 113, into power storable in the battery pack 40B.

Furthermore, the power stored in the battery pack 40B, for example, can be used for charging a vehicle such as an electric vehicle. In addition, a natural energy source may be provided in the system 110. In this case, the natural energy source generates power by natural energy such as wind power and solar light. Then, the power is supplied from the natural energy source in addition to the power generation station 111, through the power network 116.

Hereinafter, examples will be described, but the embodiments are not limited the following examples.

EXAMPLES

Example 1

<Production of Positive Electrode>
The positive electrode is produced as follows.

A lithium manganese oxide ($LiMn_2O_4$) of a spinel structure, having an average particle diameter of 10 µm, as the positive electrode active material, a black lead powder as the conductive agent, and polyvinylidene fluoride (PVdF) as the binding agent, are used. The positive electrode active material, the conductive agent, and the binding agent, are compounded respectively at a ratio of 80 weight %, 10 weight %, and 10 weight %, and are dispersed in an N-methyl-2-pyrrolidone (NMP) solvent, and thus, slurry is prepared. The prepared slurry is applied onto both surfaces of a Ti foil having a thickness of 12 µm, as the positive electrode collector, and a coating film is dried, and thus, the positive electrode active material mixture layer is formed. The positive electrode collector and the positive electrode active material mixture layer thereon are pressed, and thus, the positive electrode having an electrode density of 3.0 g/cm³ (not including the collector) is produced.

<Production of Negative Electrode>
The negative electrode, before the compound having Zn exists, is produced as follows.

A $Li_4Ti_5O_{12}$ powder having an average secondary particle diameter (a diameter) of 15 µm, as the negative electrode active material, a black lead powder as the conductive agent, and PTFE as the binding agent, are used. The negative electrode active material, the conductive agent, and the binding agent, are compounded respectively at a ratio of 80 weight %, 10 weight %, and 10 weight %, and are dispersed in an NMP solvent, and thus, slurry is prepared. The obtained slurry is applied onto a Zn foil having a thickness of 50 µm, as the negative electrode collector, and a coating film is dried, and thus, the negative electrode active material mixture layer is formed. Here, when the slurry is applied onto the Zn foil, in the negative electrode to be produced, only one surface of the Zn foil is coated with the slurry in a portion positioned on the outermost circumference of the electrode group, and both surfaces of the Zn foil are coated with the slurry in the other portions. The negative electrode collector and the negative electrode active material mixture layer thereon are pressed, and thus, the negative electrode having an electrode density of 2.0 g/cm³ (not including the collector) is produced.

<Production of Electrode Group>
The positive electrode produced as described above, an LATP ($Li_{1+x}Al_xTi_{2-x}(PO_4)_3$; $0.1 \leq x \leq 0.4$) sheet of an NASICON type skeleton having a thickness of 200 µm used as the separator, the negative electrode produced as described above, and another LATP sheet, are laminated in this order, and thus, a laminated body is obtained. Next, the laminated body is stacked such that the negative electrode is positioned on the outermost circumference, and thus, the electrode group is produced. The obtained electrode group is stored in a thin metal can formed of stainless steel, having a thickness of 0.25 mm. Furthermore, a metal can provided with a valve that leaks gas in a case where the internal pressure is greater than or equal to 2 atm, is used as the metal can.

<Preparation of Electrolyte>

3 M of LiCl and 0.25 M of $Li_2SO_4$ are dissolved in 1 L of water, as the electrolyte salt. Further, butyne-1,4-diol at a concentration of 0.1 wt % is added to such an aqueous solution, as the unsaturated alcohol that is the additive, and thus, the aqueous electrolyte is obtained.

<Production of Secondary Battery and Initial Charge and Discharge>

The aqueous electrolyte prepared as described above is injected to a metal can container containing the electrode group, and thus, two secondary batteries including the laminated electrode group having a structure in which the positive electrode and the negative electrode are alternately laminated through the separator, are produced. The aqueous electrolyte is injected to each of the secondary batteries, and then, the secondary battery is left to stand for 24 hours in an environment of 25° C. After that, in an environment of 25° C., the battery is subjected to initial charge and discharge. In the initial charge and discharge, first, the battery is charged to 2.8 V at a constant current of 5 A, and then, is discharged to 1.5 V at a constant current of 1 A. By performing the initial charge and discharge, the compound having Zn exists on the surface of the negative electrode. In addition, the capacity of the secondary battery at the time of the initial charge and discharge is confirmed. The type of negative electrode active material, the type of additive, and the added amount of the additive in the aqueous electrolyte, used in Example 1, are shown in Table 1. In Table 1, "added amount" indicates the added amount of the additive in the electrolyte.

<Observation of Zn Covering State on Negative Electrode Surface after Initial Charge and Discharge>

In the secondary battery of Example 1, the precipitation form of Zn is observed as follows. One of the secondary batteries of Example 1 after the initial charge and discharge, is disassembled, and the negative electrode is taken out. The negative electrode is washed with sufficient water, and is dried, and then, the negative electrode surface is observed with SEM-EDX at 5000 times, and thus, Zn is specified. Next, in 100 partitions obtained by equally dividing an image obtained from SEM-EDX into 10 in each of the vertical direction and the horizontal direction, the number of partitions in which the existence of the hexagonal plate-like compound is confirmed is counted, and a ratio is obtained by (Number of Partitions in which Existence of Hexagonal Plate-like Compound is Confirmed)/100. Such a procedure is performed in 10 spots on an arbitrary negative electrode surface, and thus, the average ratio is obtained, and is shown in Table 1.

<Evaluation of Average Operate Voltage>

In the secondary battery of Example 1, the average operation voltage at the time of the initial charge and discharge, is evaluated. The result thereof is shown in Table 1.

<Evaluation of Self-Discharge Performance>

In the secondary battery of Example 1, a test for evaluating the self-discharge performance is performed as follows.

The secondary battery is charged to 2.8 V at a constant current of 3 A, in an environment of 25° C., and then, a down-time for 30 minutes is set, and then, the secondary battery is discharged to 1.5 V, and the down-time for 30 minutes is set again. A cycle from the charge to the end of the second down-time, is set to one charge and discharge cycle. The charge and discharge cycle is repeated 50 times. A retention time for 24 hours is set after the 51-st charge manipulation, and the self-discharge efficiency (Charge Capacity after Retention for 24 Hours/Charge Capacity before Retention) (%) is calculated from the charge capacity before the retention and the charge capacity after the retention for 24 hours. The result of the self-discharge test is shown in Table 1.

Examples 2 to 16 and Comparative Examples 1 and 2

The secondary battery according to Examples 2 to 16 and Comparative Examples 1 and 2, is produced by the same method as that described in Example 1, by using the type of negative electrode active material, the type of positive electrode active material, the type of additive, and the added amount of the additive in the aqueous electrolyte, as shown in Table 1.

In the prepared secondary battery according to Examples 2 to 16 and Comparative Examples 1 and 2, the evaluation of the initial charge and discharge, the average operation voltage, and the self-discharge performance, and the observation of a Zn precipitation state on the negative electrode surface after the initial charge and discharge are performed, and the results are shown in Table 1.

In Example 8, $Li_4Ti_5O_{12}$ and rutile type $TiO_2$ are used at a weight ratio of 80:20, as the negative electrode active material.

In Example 13, Zn is applied onto the negative electrode surface by an initial charge and discharge manipulation, in the cell produced as described in Example 1. The negative electrode is taken out, gelatin is added to an electrolyte, in which 3 M of LiCl and 0.25 M of $Li_2SO_4$ are dissolved, thereby obtaining a gel electrolyte, and then, a cell is produced again.

TABLE 1

| | Negative electrode active material | Positive electrode active material | Aqueous solvent | Additive | Added amount of additive (wt %) | Average operation voltage (V) | Observation rate of hexagonal plate-like Zn precipitation (%) | Remaining rate from full charge after 24 hours (%) |
|---|---|---|---|---|---|---|---|---|
| Example 1 | $Li_4Ti_5O_{12}$ | $LiMn_2O_4$ | Water | Butyne-1,4-diol | 0.1 | 2.42 | 2 | 74 |
| Example 2 | $Li_4Ti_5O_{12}$ | $LiMn_2O_4$ | Water | Butyne-1,4-diol | 0.01 | 2.44 | 5 | 72 |
| Example 3 | $Li_4Ti_5O_{12}$ | $LiMn_2O_4$ | Water | Butyne-1,4-diol | 0.001 | 2.44 | 16 | 62 |
| Example 4 | $Li_4Ti_5O_{12}$ | $LiMn_2O_4$ | Water | Propargyl alcohol | 0.1 | 2.42 | 3 | 74 |

TABLE 1-continued

|  | Negative electrode active material | Positive electrode active material | Aqueous solvent | Additive | Added amount of additive (wt %) | Average operation voltage (V) | Observation rate of hexagonal plate-like Zn precipitation (%) | Remaining rate from full charge after 24 hours (%) |
|---|---|---|---|---|---|---|---|---|
| Example 5 | $Li_4Ti_5O_{12}$ | $LiMn_2O_4$ | Water | Coumarin | 0.1 | 2.43 | 1 | 75 |
| Example 6 | $Li_4Ti_5O_{12}$ | $LiMn_2O_4$ | Water/NMP = 9/1 | Butyne-1,4-diol | 0.1 | 2.43 | <1 | 92 |
| Example 7 | $Li_4Ti_5O_{12}$ | $LiMn_2O_4$ | Water/ethanol = 9/1 | Butyne-1,4-diol | 0.1 | 2.41 | <1 | 91 |
| Example 8 | $Li_4Ti_5O_{12}/TiO_2$ (Rutile type) 80/20 (wt %) | $LiMn_2O_4$ | Water | Butyne-1,4-diol | 0.1 | 2.3 | 2 | 72 |
| Example 9 | $Nb_2TiO_7$ | $LiMn_2O_4$ | Water | Butyne-1,4-diol | 0.1 | 2.64 | 3 | 70 |
| Example 10 | $Li_2Na_2Ti_6O_{14}$ | $LiMn_2O_4$ | Water | Butyne-1,4-diol | 0.1 | 2.72 | 2 | 71 |
| Example 11 | $Li_4Ti_5O_{12}$ | $LiCoO_2$ | Water | Butyne-1,4-diol | 0.1 | 2.4 | 2 | 72 |
| Example 12 | $Li_4Ti_5O_{12}$ | $LiMnPO_4$ | Water | Butyne-1,4-diol | 0.1 | 1.89 | 2 | 75 |
| Example 13 | $Li_4Ti_5O_{12}$ | $LiMn_2O_4$ | Water (gelatin gel) | Butyne-1,4-diol | 0.1 | 2.42 | 2 | 72 |
| Example 14 | $Li_4Ti_5O_{12}$ | $LiMn_2O_4$ | Water/NMP = 9/1 | Coumarin | 0.1 | 2.43 | <1 | 93 |
| Example 15 | $Li_4Ti_5O_{12}$ | $LiMn_2O_4$ | Water | Coumarin and butyne-1,4-diol | (Coumarin)0.05/ (butyne-1,4-diol)0.05 | 2.42 | 1 | 76 |
| Example 16 | $Li_4Ti_5O_{12}$ | $LiMn_2O_4$ | Water/NMP = 9/1 | Coumarin and butyne-1,4-diol | (Coumarin)0.05/ (butyne-1,4-diol)0.05 | 2.43 | <1 | 91 |
| Comparative Example 1 | $Li_4Ti_5O_{12}$ | $LiMn_2O_4$ | Water | Not added | — | 2.46 | 91 | 38 |
| Comparative Example 9 | $Li_4Ti_5O_{12}$ | $LiMn_2O_4$ | Water | Butyne-1,4-diol | 0.0001 | 2.46 | 25 | 46 |

As shown in Table 1, in the lithium secondary battery of Examples 1 to 16, high remaining capacity is exhibited even after the retention time for 24 hours from full charge. In Examples 6 and 7 or the like, in which the electrolyte is mixed with an organic solvent, the most excellent self-discharge performance is exhibited.

In addition, in Examples 9 and 10 in which the type of negative electrode active material is changed to a niobium titanium oxide or a sodium niobium titanium oxide, a high average operation voltage can also be attained while attaining sufficient self-discharge performance.

In addition, in Examples 11 and 12 in which the type of positive electrode active material is changed to a lithium cobalt composite oxide or a lithium phosphate compound having an olivine structure, sufficient self-discharge performance can be attained.

In the secondary battery of Comparative Example 1 to which the unsaturated alcohol or the coumarin is not added, and Comparative Example 2 in which an added amount of the unsaturated alcohol is as small as 0.0001 wt %, the self-discharge performance is remarkably low.

In the examples, the precipitated Zn is amorphous, and the precipitation of the hexagonal plate-like compound is rarely observed, whereas in Comparative Example 1, most of the compounds existing on the negative electrode surface is confirmed as the shape of a hexagonal plate. In addition, in Comparative Example 2, it is confirmed that the hexagonal plate-like compound of approximately 25% exists.

According to at least one embodiment described above, the secondary battery in which the hexagonal plate-like compound having Zn is suppressed to be less than or equal to 20%, as the precipitation form of Zn on the electrode surface, is capable of suppressing the generation of hydrogen from the collector, and is capable of attaining an excellent charge and discharge efficiency and an excellent self-discharge characteristic.

Several embodiments of the invention have been described, but the embodiments are described as an example, and are not intended to limit the scope of the invention. Such novel embodiments can be carried out in other various forms, and various omissions, substitutions, and changes can be performed within a range not departing from the gist of the invention. Such embodiments and the modifications thereof are included in the scope and the gist of the invention, and are included in the invention described in the claims and the equivalent scope thereof.

What is claimed is:

1. A secondary battery comprising:
an aqueous electrolyte, the aqueous electrolyte comprising 0.001 wt % to 0.1 wt % of at least one selected from the group consisting of unsaturated alcohol and coumarin;
a positive electrode; and
a negative electrode,
the negative electrode comprising:
a current collector; and
an active material-containing layer having active materials on the current collector,
wherein the active material-containing layer has a first surface contacting the current collector and a second surface which is opposite side of the first surface,
at least one part of the second surface is covered by a compound containing Zn, and
when an image of the second surface is taken by Scanning Electron Microscope, the image is divided into 100 blocks, a ratio of existence of blocks having hexagonal platelet shaped compound containing Zn to the 100 blocks is calculated, and the ratio of existence of blocks is calculated with respect to 10 images,
an average of the ratio of existence of blocks with respect to the 10 images is 20% or less (including 0).

2. The secondary battery according to claim 1,
wherein the average of existence of blocks with respect to the 10 images is 15% or less (including 0).

3. The secondary battery according to claim 1,
wherein the compound containing Zn comprises at least one element selected from the group consisting of Sn, Hg, In, Cd, and Pb.

4. The secondary battery according to claim 1, wherein the aqueous electrolyte comprises an organic solvent which is comprised 20 vol % or less in the aqueous electrolyte.

5. The secondary battery according to claim 1, wherein the electrode active material in the negative electrode has a lithium ion insertion/extraction potential range of 1 V or more and 3 V or less (vs. Li/Li$^+$) based on metallic lithium electrical potential.

6. The secondary battery according to claim 1, wherein a positive active material in the positive electrode has a lithium ion insertion/extraction potential range of 2.5 V or more and 5.5 V or less (vs. Li/Li$^+$) based on metallic lithium electrical potential.

7. A battery pack comprising the secondary battery according to claim 1.

8. The battery pack according to claim 7, further comprising:
an external terminal for electrically connecting; and
a protective circuit.

9. The battery pack according to claim 7, wherein a plurality of the secondary batteries are electrically connected in series, in parallel or a combination of series and parallel.

10. A vehicle comprising the battery pack according to claim 7.

11. The vehicle according to claim 10, wherein the battery pack is recharged by regenerative energy of driving forth of the vehicle.

12. A stationary power source comprising the battery pack according to claim 7.

13. A secondary battery comprising:
an aqueous electrolyte, the aqueous electrolyte comprising 0.001 wt % to 0.1 wt % of at least one selected from the group consisting of unsaturated alcohol and coumarin;
a positive electrode; and
a negative electrode,
the negative electrode comprising:
a current collector; and
an active material-containing layer on the current collector, the active material-containing layer comprising active materials and having a first surface in contact with the current collector and a second surface on a side opposite thereto,
at least a part of the second surface being covered by a compound containing Zn, and an average of a ratio of existence of a hexagonal platelet shaped compound comprising Zn is 20% or less (including 0).

* * * * *